United States Patent
Yoshino

(10) Patent No.: US 9,809,225 B2
(45) Date of Patent: Nov. 7, 2017

(54) DRIVE FORCE CONTROL DEVICE AND DRIVE FORCE CONTROL METHOD FOR VEHICLE

(71) Applicant: Nissan Motor Co., Ltd., Kanagawa (JP)

(72) Inventor: Takahiro Yoshino, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 309 days.

(21) Appl. No.: 14/760,107

(22) PCT Filed: Dec. 18, 2013

(86) PCT No.: PCT/JP2013/083993
§ 371 (c)(1),
(2) Date: Jul. 9, 2015

(87) PCT Pub. No.: WO2014/109195
PCT Pub. Date: Jul. 17, 2014

(65) Prior Publication Data
US 2015/0353090 A1    Dec. 10, 2015

(30) Foreign Application Priority Data
Jan. 11, 2013    (JP) .................. 2013-003987

(51) Int. Cl.
*B60W 30/188*    (2012.01)
*B60W 10/107*    (2012.01)
(Continued)

(52) U.S. Cl.
CPC .......... *B60W 30/188* (2013.01); *B60W 10/04* (2013.01); *B60W 10/101* (2013.01);
(Continued)

(58) Field of Classification Search
None
See application file for complete search history.

(56) References Cited

U.S. PATENT DOCUMENTS 6,090,007 A * 7/2000 Nakajima .............. B60K 6/485
                                                                477/15

FOREIGN PATENT DOCUMENTS

JP    2001-328462 A    11/2001
JP    2003-25869 A    1/2003
(Continued)

*Primary Examiner* — Jacob S Scott
(74) *Attorney, Agent, or Firm* — Osha Liang LLP

(57) ABSTRACT

A drive force control device for a vehicle having a continuously variable transmission that varies an output rotation of a motive force source and transmits a rotation after variation to a drive wheel includes an accelerator pedal opening sensor that detects an accelerator opening of an accelerator pedal with which the vehicle is provided, and a programmable controller programmed to calculate a target drive force on the basis of the accelerator opening, calculate a target transmission input rotation speed on the basis of the target drive force, calculate a target transmission input torque on the basis of the target drive force, control a speed ratio of the continuously variable transmission to realize the target transmission input rotation speed, and control an output torque of the motive force source to realize the target transmission input torque.

9 Claims, 35 Drawing Sheets

(51) Int. Cl.
  *F16H 59/14* (2006.01)
  *F02D 29/02* (2006.01)
  *F16H 63/50* (2006.01)
  *B60W 10/11* (2012.01)
  *B60W 10/101* (2012.01)
  *B60W 10/04* (2006.01)
  *F16H 59/18* (2006.01)

(52) U.S. Cl.
  CPC .......... *B60W 10/107* (2013.01); *B60W 10/11* (2013.01); *F02D 29/02* (2013.01); *F16H 59/14* (2013.01); *F16H 63/50* (2013.01); *B60W 2540/10* (2013.01); *B60W 2710/0666* (2013.01); *B60W 2710/1005* (2013.01); *F16H 59/18* (2013.01); *F16H 2059/148* (2013.01)

(56) References Cited

FOREIGN PATENT DOCUMENTS

| | | |
|---|---|---|
| JP | 2010-65748 A | 3/2010 |
| JP | 2010-151154 A | 7/2010 |

\* cited by examiner

DRIVE FORCE CONTROL DEVICE AND DRIVE FORCE CONTROL METHOD FOR VEHICLE

CROSS-REFERENCE TO RELATED APPLICATIONS

The present application is a national stage application of PCT/JP2013/083993 filed Dec. 18, 2013, which claims priority to Tokugan JP2013-003987, filed Jan. 11, 2013 in Japan, the contents of which are hereby incorporated by reference in their entirety.

BACKGROUND

Technical Field

The present invention relates to powertrain torque demand control for controlling a speed ratio and an operation of an internal combustion engine on the basis of a target vehicle drive force.

Related Art

So-called engine torque demand (ETD) control, in which an output of an internal combustion engine is controlled on the basis of a depression amount of an accelerator pedal and a speed ratio of an automatic transmission is controlled on the basis of the depression amount of the accelerator pedal and a vehicle speed, is widely employed as a conventional method of controlling a drive force of a vehicle. In this control method, the engine and the transmission are controlled independently in accordance with respective individual target values.

JP2001-328462A, published by the Japan Patent Office in 2001, proposes powertrain torque demand (PTD) control, in which a target vehicle drive force is set on the basis of an accelerator pedal depression amount and a vehicle speed, whereupon a speed ratio of an automatic transmission and a torque of an internal combustion engine are controlled in an integrated fashion so that the target vehicle drive force is obtained.

SUMMARY OF INVENTION

When this prior art is applied to a vehicle installed with a continuously variable transmission, the target drive force of the vehicle is set on the basis of an operating condition, whereupon a target rotation speed and a target torque of the internal combustion engine are determined on the basis of the target drive force. Further, this prior art teaches that when a running load of the vehicle is large, the target rotation speed of the internal combustion engine is corrected to be slightly higher, and when the target rotation speed is corrected to be slightly higher, the target torque is calculated using the target rotation speed prior to the correction.

With this control method, however, when the target rotation speed is corrected, the target torque is calculated using the target rotation speed prior to the correction, and as a result, the drive force tends to deviate from the target drive force.

Further, when the target rotation speed alone is corrected to be slightly higher while maintaining the target torque as is, an increase sensitivity of the drive force may become excessive, leading to deterioration of the drivability.

One or more embodiments of the present invention improves PTD control by realizing drive force control having a similar response and following ability to conventional ETD control.

According to one or more embodiments of the present invention, a drive force control device for a vehicle comprising a continuously variable transmission that varies an output rotation of a motive force source and transmits a rotation after variation to a drive wheel, and comprises an accelerator pedal opening sensor that detects an accelerator opening of an accelerator pedal with which the vehicle is provided, and a programmable controller.

The controller is programmed to calculate a target drive force on the basis of the accelerator opening, calculate a target transmission input rotation speed on the basis of the target drive force, calculate a target transmission input torque on the basis of the target drive force, control a speed ratio of the continuously variable transmission to realize the target transmission input rotation speed, and control an output torque of the motive force source to realize the target transmission input torque.

The controller is further programmed to calculate a target transmission input rotation speed basic value on the basis of the target drive force, calculate a target transmission input rotation speed on the basis of the target transmission input rotation speed basic value and an individually required target transmission input rotation speed, calculate a target drive force basic value on the basis of the accelerator opening, calculate a target transmission input rotation speed lower limit basic value on the basis of an individual requirement, and calculate the target drive force on the basis of the target drive force basic value and the target transmission input rotation speed lower limit basic value.

The details as well as other features and advantages of embodiments of the present invention are set forth in the remainder of the specification and are shown in the accompanying drawings.

DETAILED DESCRIPTION

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. A drive force control device for a vehicle according to a first embodiment of the present invention will be described below.

Figure 1:
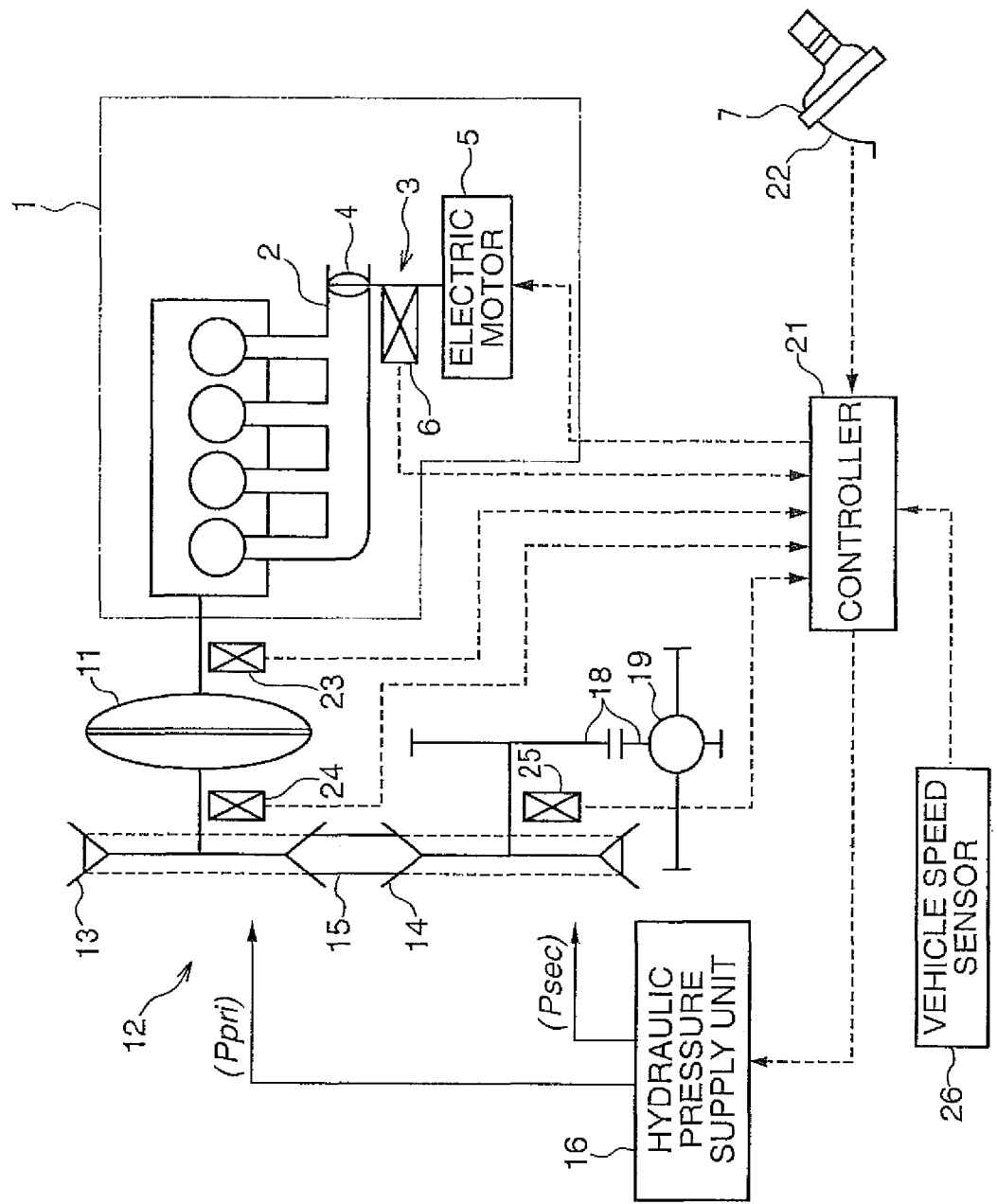
FIG. 1 is a schematic diagram of a drive force control device for a vehicle according to first embodiment of the present invention.

Referring to FIG. 1 of the drawings, an output of an internal combustion engine 1 of a vehicle is input into a continuously variable transmission (CVT) 12 via a torque converter 11. The CVT 12 comprises a primary pulley 13, a secondary pulley 14, and a V-belt 15 wound around the primary pulley 13 and the secondary pulley 14. A contact radius by which the primary pulley 13 contacts the V-belt 15 is varied by varying a groove width of the primary pulley 13 in accordance with a hydraulic pressure Ppri. A contact radius by which the secondary pulley 14 contacts the V-belt 15 is varied by varying a groove width of the secondary pulley 14 in accordance with a hydraulic pressure Psec. As a result, a ratio between an input rotation speed and an output rotation speed, or in other words a speed ratio, of the CVT 12 is varied continuously in accordance with control of the hydraulic pressure Ppri and the hydraulic pressure Psec. The hydraulic pressure Ppri and the hydraulic pressure Psec are generated by a hydraulic pressure supply unit 16.

The secondary pulley 14 is joined to a drive wheel via a final gear 18 and a differential 19.

The internal combustion engine 1 comprises an intake throttle device 3 that adjusts an intake air amount. The intake throttle device 3 comprises an intake throttle 4 provided in an intake passage 2 of the internal combustion engine 1, and an electric motor 5 that varies an opening of the intake throttle in response to an input signal.

The hydraulic pressure supply unit 16 and the intake throttle device 3 operate in response to command signals output by a controller 21.

The controller 21 is constituted by a microcomputer comprising a central processing unit (CPU), a read-only memory (ROM), a random access memory (RAM), and an input/output interface (I/O interface). The controller may be constituted by a plurality of microcomputers.

Detection signals from a throttle opening sensor 6 that detects a throttle opening of the intake throttle 4, an accelerator opening sensor 22 that detects an accelerator opening of an accelerator pedal 7 provided in the vehicle, an engine rotation speed sensor 23 that detects a rotation speed of the internal combustion engine 1, a primary pulley rotation speed sensor 24 that detects a rotation speed of the primary pulley 13, a secondary pulley rotation speed sensor 25 that detects a rotation speed of the secondary pulley 14, and a vehicle speed sensor 26 that detects a running speed of the vehicle are input respectively into the controller 21 in the form of signals.

The controller 21 controls a drive force of the vehicle by controlling the opening of the intake throttle 4 and performing speed change control on the CVT 12 via the hydraulic pressure supply unit 16 in accordance with these detection signals.

Next, a basic outline of the control executed by the drive force control device will be described.

Figure 2:
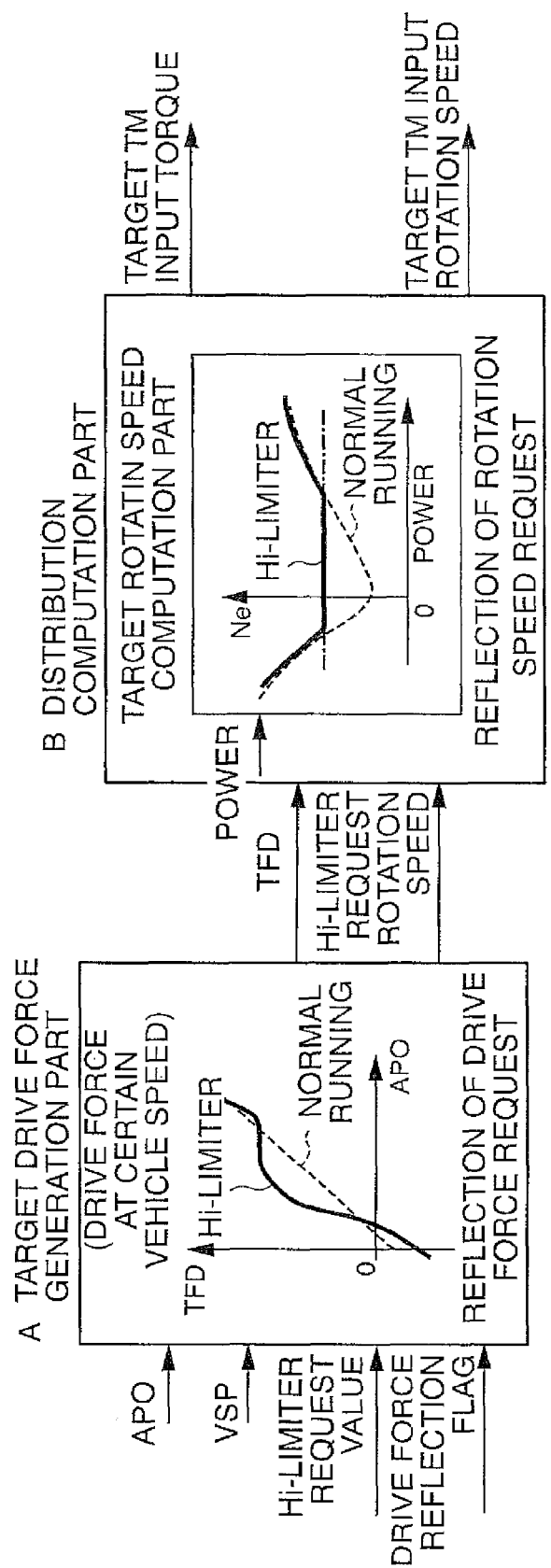
FIG. 2 is a block diagram illustrating functions of a target drive force generation part and a distribution computation part provided in the drive force control device.

Referring to FIG. 2, the controller 21 comprises a target drive force generation part A and a distribution computation part B. The target drive force generation part A determines a target drive force TFD for use during Hi-limiter application on the basis of input signals indicating the accelerator opening, the vehicle speed, and so on, and the distribution computation part B calculates a target transmission (TM) input torque and a target TM input rotation speed of the CVT 12 at which the target drive force is obtained.

Referring to a diagram illustrated in the block of the distribution computation part B, a relationship between the drive force and an engine rotation speed Ne of the vehicle is set such that during normal speed change control, as shown by a dotted line, the engine rotation speed Ne decreases greatly when the drive force is at zero, or in other words in the vicinity of a boundary between a negative drive force, which is obtained during engine braking, and a positive drive force.

In the target drive force generation part A, even when the target drive force is corrected to an increase side by the Hi-limiter, for example, as shown by a solid line in the figure, the engine rotation speed Ne dips in the vicinity of the drive force boundary, as shown in the diagram of the distribution computation part B, leading inevitably to large variation in the engine rotation speed Ne. In this variation region, an output response relative to an accelerator operation decreases, and moreover, a driver may experience a sense of discomfort in terms of drivability.

The controller 21 according to one or more embodiments of the present invention prevents the rotation speed from decreasing during re-acceleration by correcting the target drive force in a deceleration state and calculating the target input rotation speed of the CVT 12 in the deceleration state on the basis of the corrected target drive force, and correcting the target input rotation speed of the CVT 12 in a non-deceleration state on the basis of the target input rotation speed of the CVT 12 in the deceleration state.

Referring to FIGS. 3-20, drive force control executed by the controller 21 for this purpose will be described. It should be noted that respective blocks shown in FIGS. 3-20 depict respective functions of the controller 21 as imaginary units that do not exist physically. This applies likewise to respective blocks shown in FIGS. 21-35.

Figure 3:
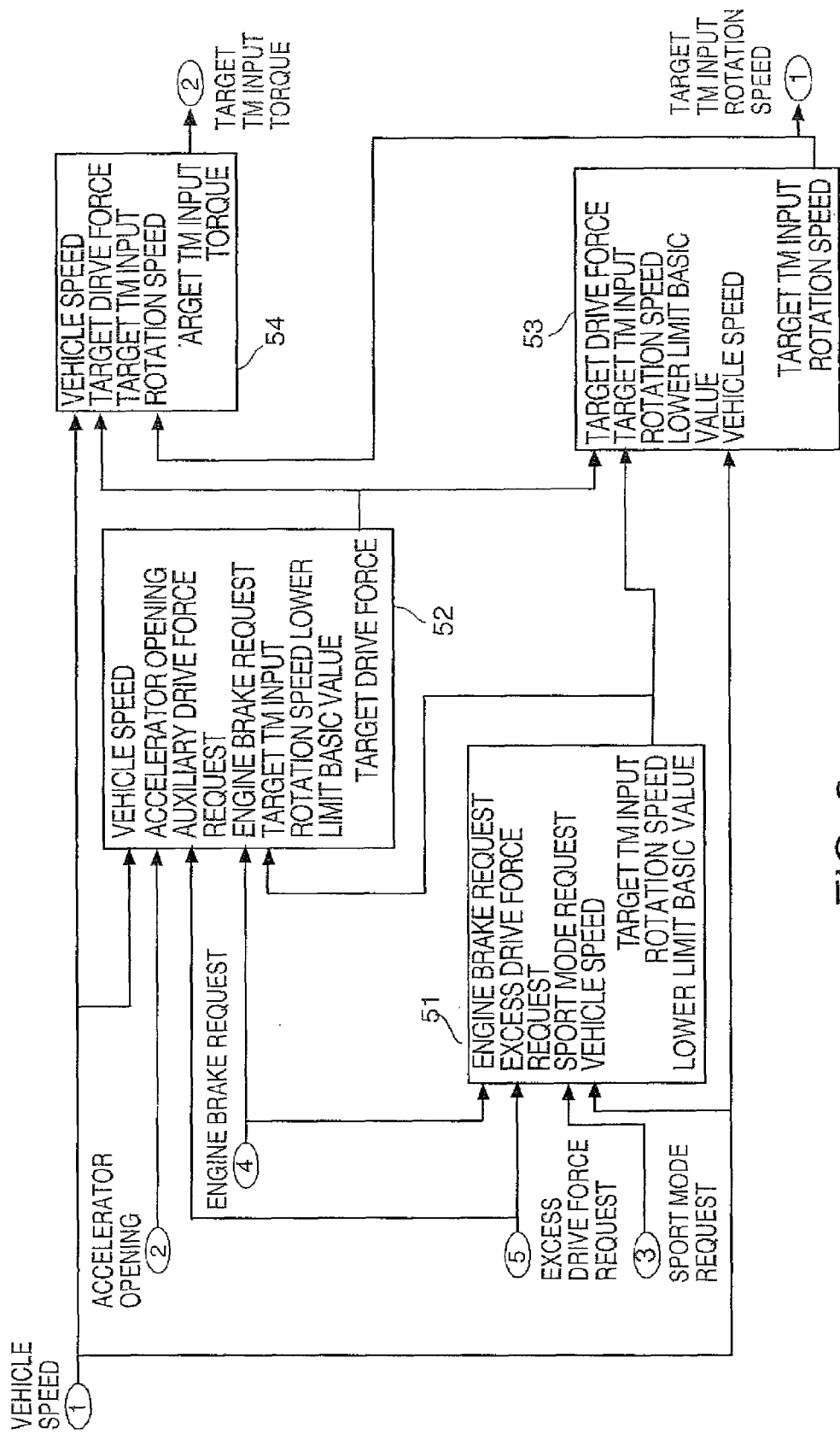
FIG. 3 is a block diagram illustrating configurations of the target drive force generation part and the distribution computation part.

Referring to FIG. 3, the target drive force generation part A of FIG. 2 is constituted by a target TM input rotation speed lower limit basic value computation part 51 and a target drive force computation part 52. The distribution computation part B is constituted by a target TM input rotation speed computation part 53 and a target TM input torque computation part 54. The controller 21 controls the intake throttle device 3 and the CVT 12 on the basis of these configurations.

First, individual configurations of the target drive force generation part A will be described.

Figure 4:
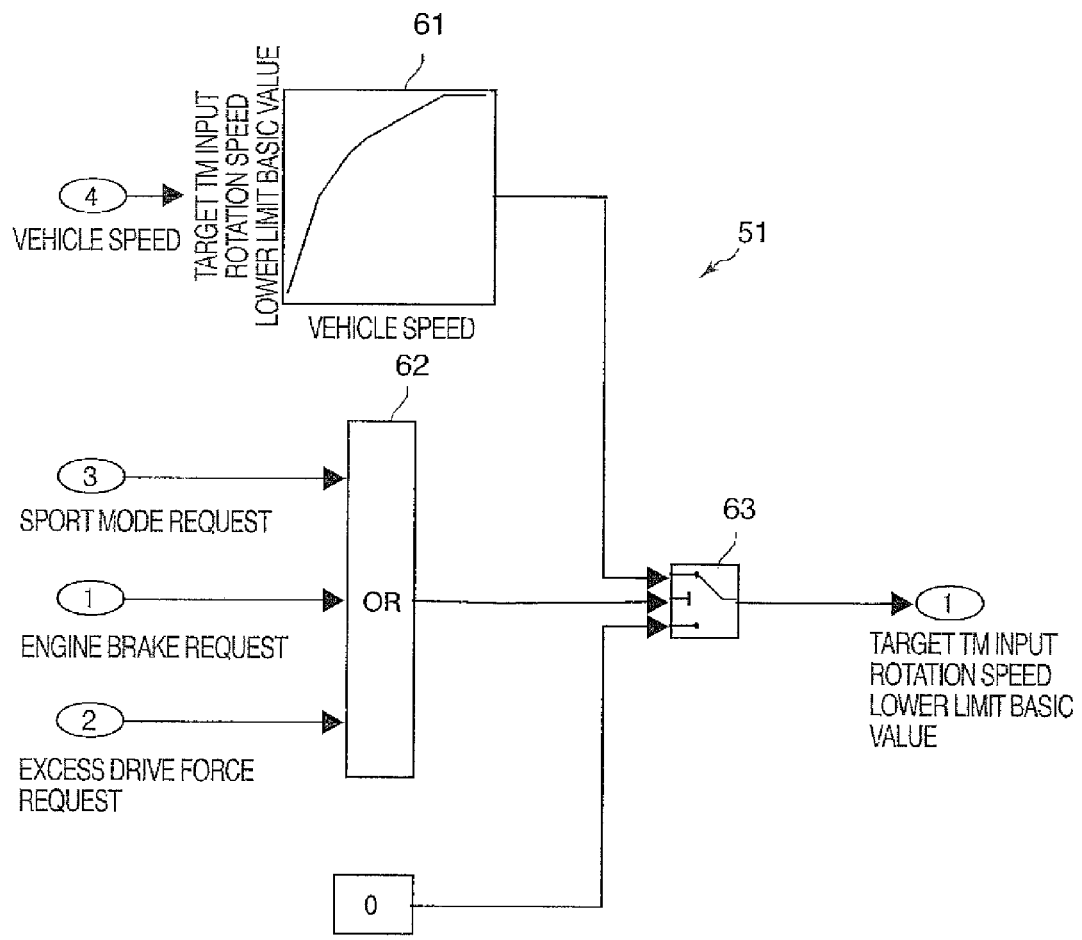
FIG. 4 is a block diagram illustrating a configuration of a target transmission (TM) input rotation speed lower limit basic value computation part provided in the target drive force generation part.

Referring to FIG. 4, the target TM input rotation speed lower limit basic value computation part 51 shown in FIG. 3 comprises a target TM input rotation speed lower limit basic value search part 61, an OR circuit 62, and a switch 63.

The target TM input rotation speed lower limit basic value search part 61 retrieves a target TM input rotation speed lower limit basic value from the vehicle speed by referring to a map stored in advance in the ROM. The OR circuit 62 outputs an ON signal to the switch 63 when any one of a sport mode request, an engine brake request, and an excess drive force request has been issued.

The sport mode request is switched ON when the driver operates a switch attached to a shift lever of the vehicle. The engine brake request is issued to boost engine braking, and is switched ON when the shift lever enters an L range, for example.

When the vehicle comprises a navigation system, the excess drive force request is switched ON on the basis of information indicating a winding road or the like, for example, with the aim of improving a drive force response to an accelerator operation.

The sport mode request, engine braking request, and excess drive force request described above will be referred to collectively as an individual request.

When any one of these requests is ON, the OR circuit 62 switches the switch 63 from zero to the target TM input rotation speed lower limit basic value determined by the target TM input rotation speed lower limit basic value search part 61. When all of the requests input into the OR circuit 62 are OFF, the OR circuit 62 switches the switch 63 from the target TM input rotation speed lower limit basic value to zero.

Figure 5:
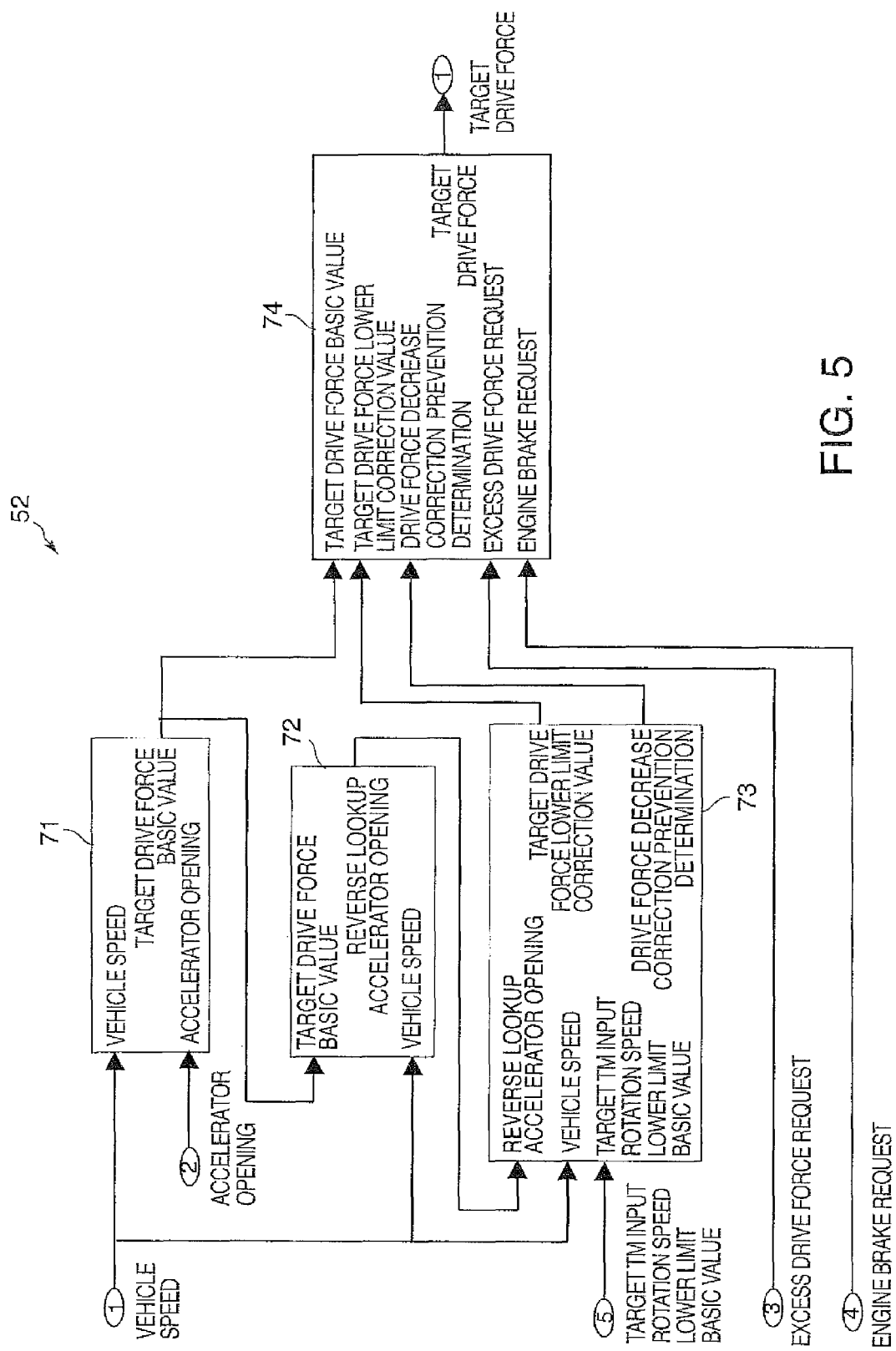
FIG. 5 is a block diagram illustrating a configuration of a target drive force computation part provided in the target drive force generation part.

Referring to FIG. 5, the target drive force computation part 52 of FIG. 3 comprises a target drive force basic value computation part 71, a reverse lookup accelerator opening computation part 72, a target drive force lower limit correction value computation and drive force decrease correction prevention determining part 73, and a target drive force output part 74.

Figure 11:
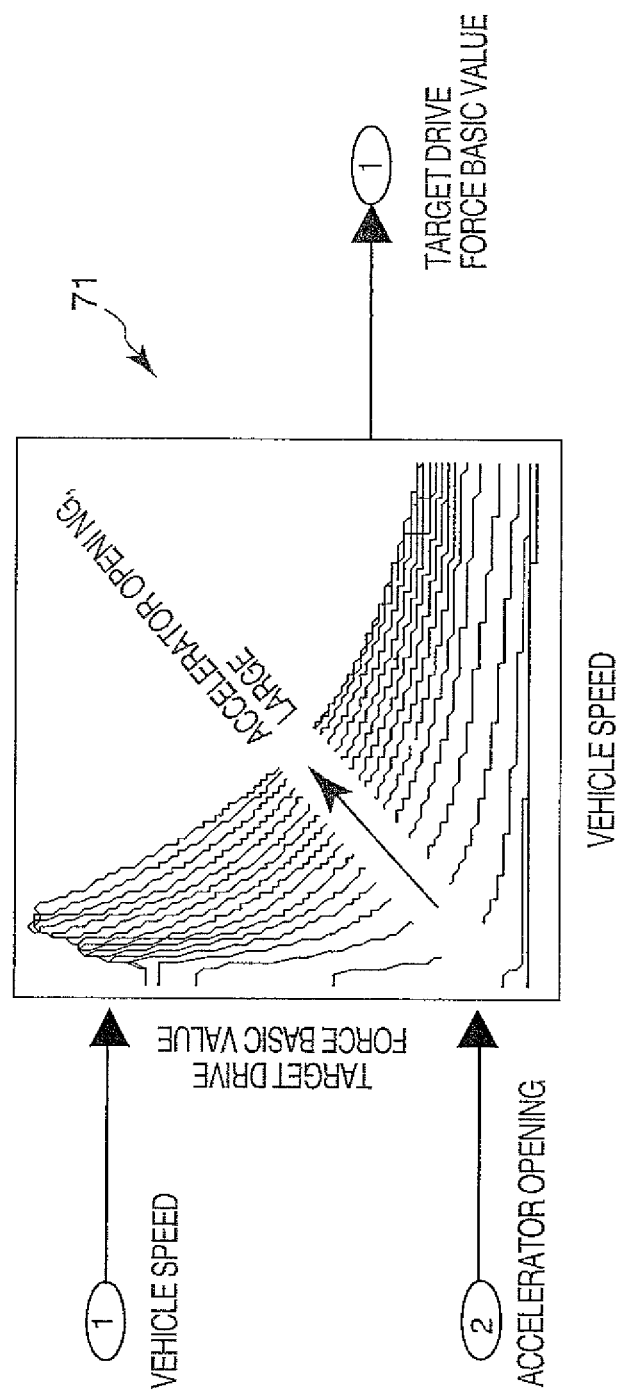
FIG. 11 is a block diagram illustrating a configuration of a target drive force basic value computation part provided in the target drive force computation part.

FIG. 11 shows a configuration of the target drive force basic value computation part 71.

Referring to FIG. 11, the target drive force basic value computation part 71 calculates a target drive force basic value from the vehicle speed and the accelerator opening by referring to a map 131 stored in advance in the ROM of the controller 21.

Figure 6:
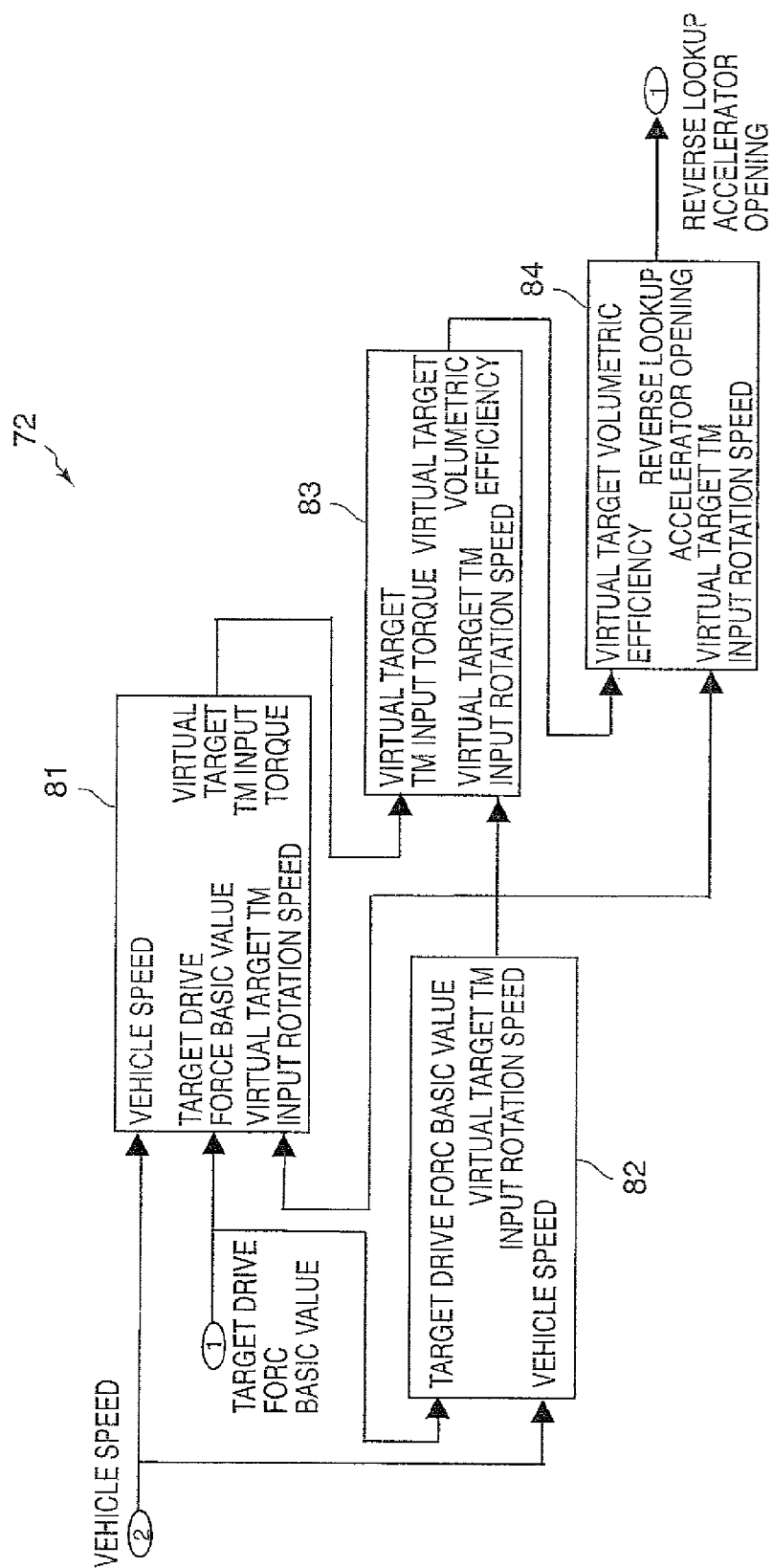
FIG. 6 is a block diagram illustrating a configuration of a reverse lookup accelerator opening computation part provided in the target drive force generation part.

FIG. 6 shows a configuration of the reverse lookup accelerator opening computation part 72. The reverse lookup accelerator opening computation part 72 comprises a virtual target TM input torque computation part 81, a virtual target TM input rotation speed computation part 82, a virtual target volumetric efficiency computation part 83, and a reverse lookup accelerator opening output part 84.

Figure 7:
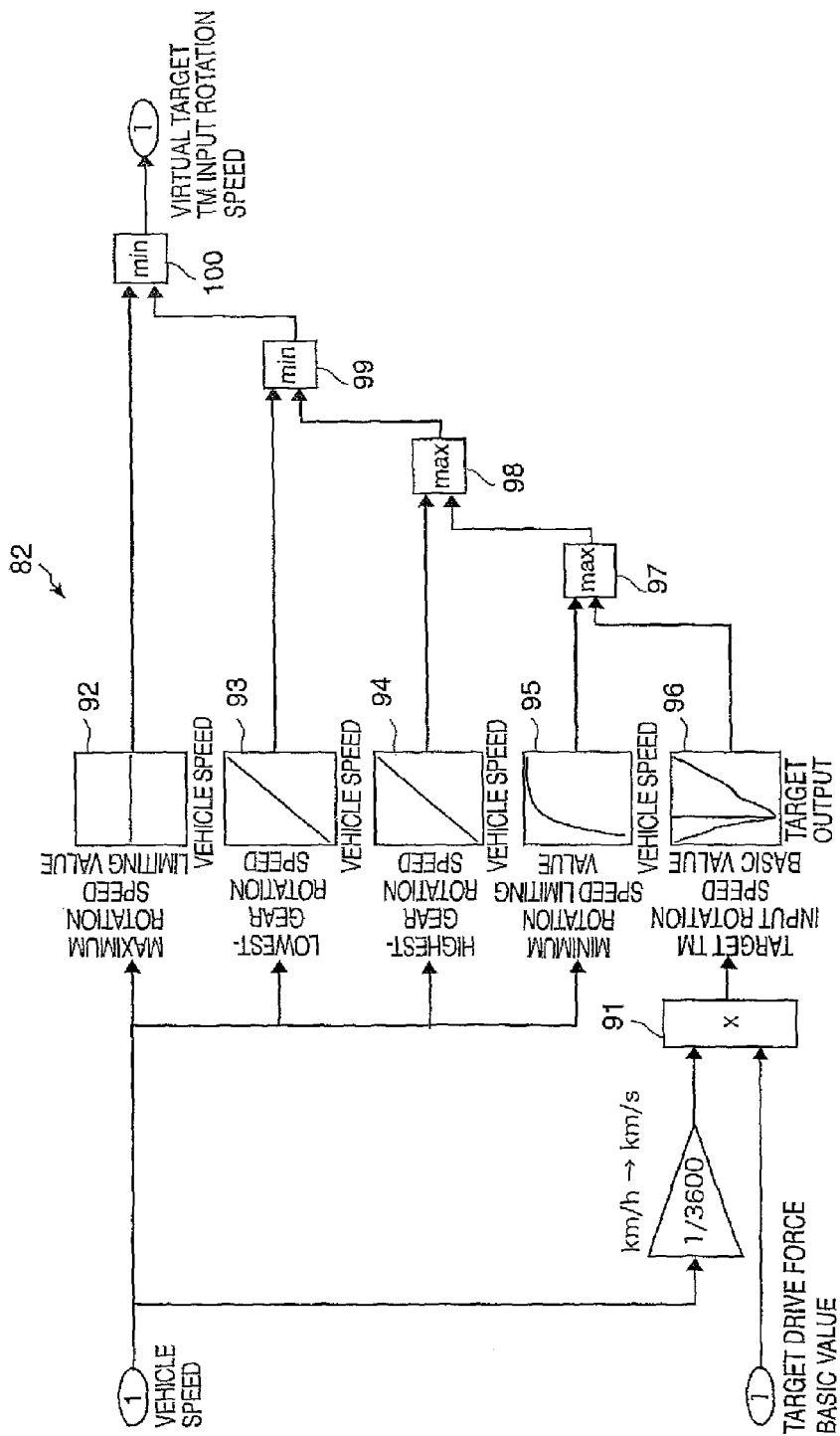
FIG. 7 is a block diagram illustrating a configuration of a virtual target TM input rotation speed computation part provided in the reverse lookup accelerator opening computation part.

FIG. 7 shows a configuration of the virtual target TM input rotation speed computation part 82.

Referring to FIG. 7, the virtual target TM input rotation speed computation part 82 comprises a maximum rotation speed limiting value computation part 92, a lowest-gear rotation speed computation part 93, a highest-gear rotation speed computation part 94, a minimum rotation speed limiting value computation part 95, a multiplier 91, a target TM input rotation speed basic value computation part 96, maximum value output circuits 97 and 98, and minimum value output circuits 99 and 100.

The maximum rotation speed limiting value computation part 92 outputs a maximum rotation speed limiting value, the maximum rotation speed limiting value being a fixed value stored in advance. The lowest-gear rotation speed computation part 93 calculates a lowest-gear rotation speed on the basis of a lowest-gear speed ratio of the CVT 12 from the vehicle speed by referring to a map stored in advance in the ROM of the controller 21. The highest-gear rotation speed computation part 94 calculates a highest-gear rotation speed on the basis of a highest-gear speed ratio of the CVT 12 from the vehicle speed by referring to a map stored in advance in the ROM of the controller 21. The minimum rotation speed limiting value computation part 95 calculates a minimum rotation speed limiting value from the vehicle speed by referring to a map stored in advance in the ROM of the controller 21. The multiplier 91 calculates a target output by multiplying the target drive force output by the target drive force computation part 52 by the vehicle speed, the vehicle speed having been converted into a speed per second. An output corresponding to a load of an accessory may also be added to the target output. Further, in the case of a hybrid electric vehicle (HEV), a target power generation output may also be added. The target TM input rotation speed basic value computation part 96 calculates a target TM input rotation speed basic value from the target output by referring to a map stored in advance in the ROM of the controller 21.

The maximum value output circuit 97 outputs the larger of an output of the target TM input rotation speed basic value computation part 96 and the minimum rotation speed limiting value output by the minimum rotation speed limiting value computation part 95. The maximum value output circuit 98 outputs the larger of the output of the maximum value output circuit 97 and the highest-gear rotation speed output by the highest-gear rotation speed computation part 94.

The minimum value output circuit 99 outputs the smaller of the output of the maximum value output circuit 98 and the lowest-gear rotation speed output by the lowest-gear rotation speed computation part 93. The minimum value output circuit 100 outputs the smaller of the output of the minimum value output circuit 99 and the maximum rotation speed limiting value output by the maximum rotation speed limiting value computation part 92 as a virtual target TM input rotation speed.

Figure 8:
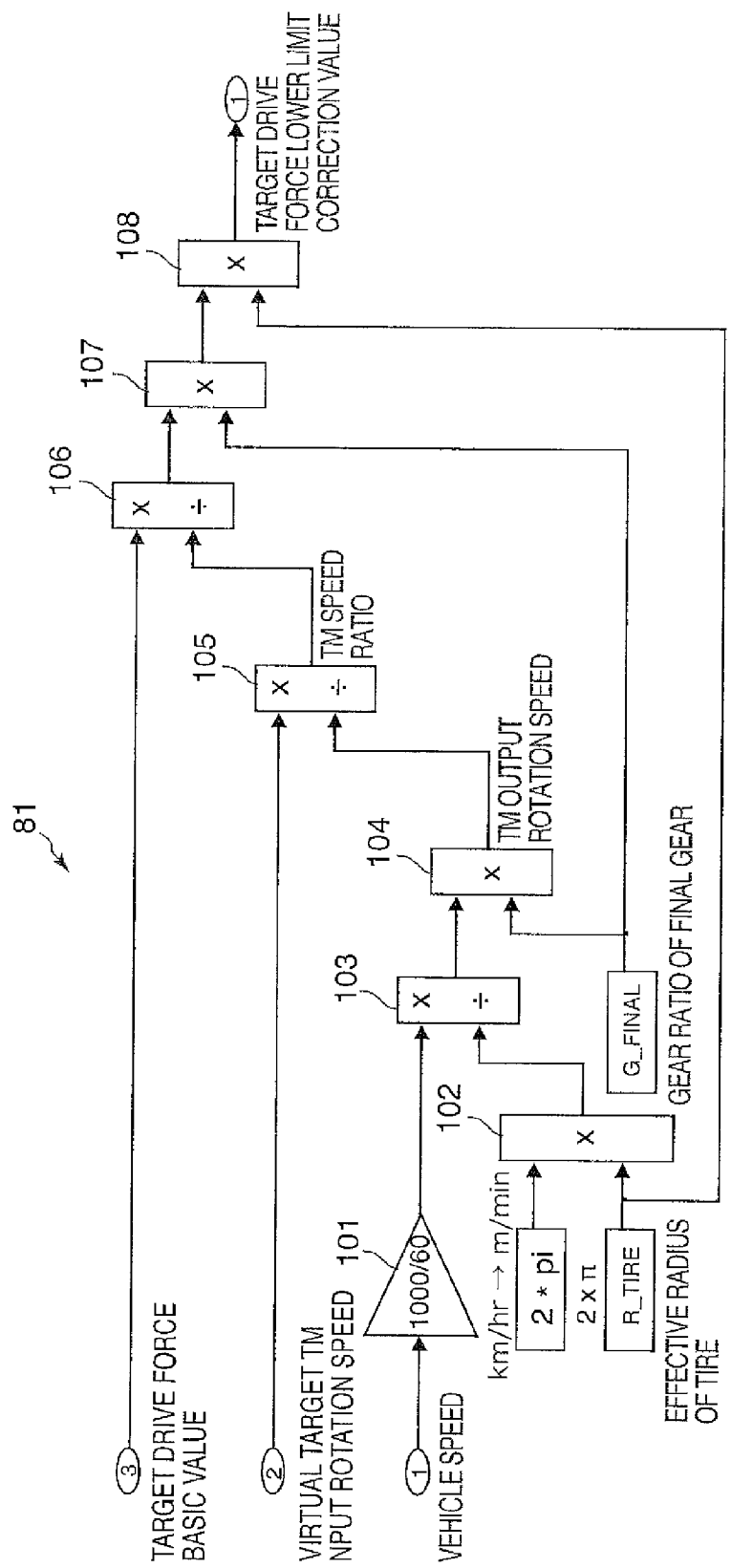
FIG. 8 is a block diagram illustrating a configuration of a virtual target TM input torque computation part provided in the reverse lookup accelerator opening computation part.

FIG. 8 shows a configuration of the virtual target TM input torque computation part 81.

Referring to FIG. 8, the virtual target TM input torque computation part 81 comprises a unit converter 101, dividers 103, 105, 106, and multipliers 102, 104, 107, 108.

The unit converter 101 converts the vehicle speed into m/min units. The multiplier 102 calculates a circumferential distance of a tire from a diameter of the tire. The divider 103 calculates a rotation speed of the tire from the vehicle speed and the circumferential distance of the tire. The multiplier 104 calculates the output rotation speed of the CVT 12 by multiplying a gear ratio of the final gear 18 provided between the CVT 12 and the drive wheel of the vehicle by the rotation speed of the tire. The divider 105 converts a virtual target TM input rotation speed lower limit value computed by the virtual target TM input rotation speed computation part 82 into a speed ratio of the CVT 12 by dividing the virtual target TM input rotation speed lower limit value by the output rotation speed of the CVT 12.

The divider 106 computes a virtual target output torque lower limit correction value of the CVT 12 by dividing a virtual target TM input torque lower limit correction value by the speed ratio of the CVT 12. The multiplier 107 calculates a virtual final torque correction value by multiplying the final gear ratio by the virtual target output torque lower limit correction value. The multiplier 128 computes a virtual target TM input torque by multiplying an effective tire radius R_TIRE by the virtual final torque correction value.

Figure 9:
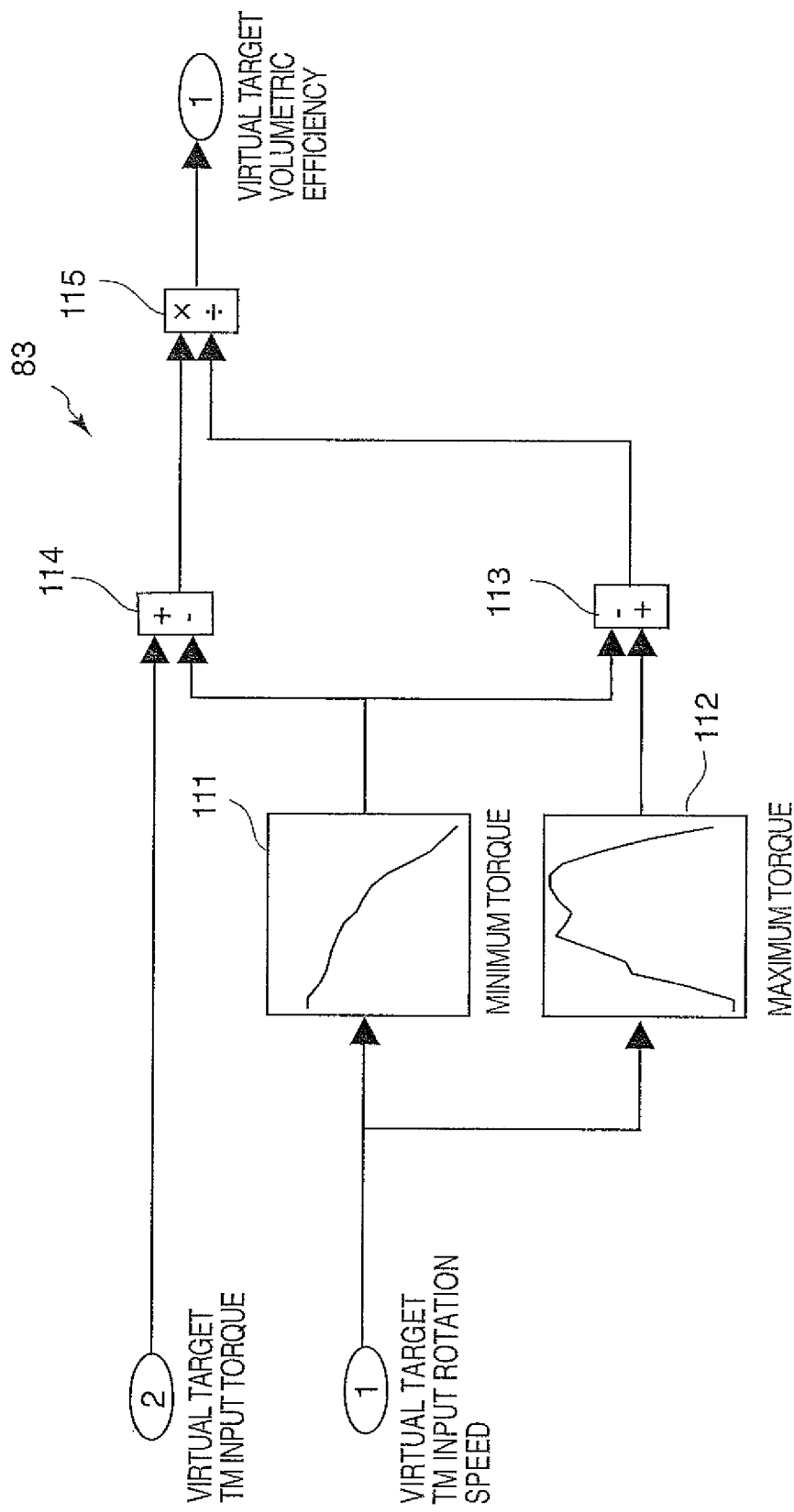
FIG. 9 is a block diagram illustrating a configuration of a virtual target volumetric efficiency computation part provided in the reverse lookup accelerator opening computation part.

FIG. 9 shows a configuration of the virtual target volumetric efficiency computation part 83.

Referring to FIG. 9, the virtual target volumetric efficiency computation part 83 comprises a minimum torque computation part 111 that determines a minimum value of an input torque input into the CVT 12 from the virtual target TM input rotation speed lower limit value, a maximum torque computation part 112 that determines a maximum value of the input torque input into the CVT 12 in an identical manner, a subtracter 113 that determines a difference between the maximum value and the minimum value of the input torque, a subtracter 114 that calculates a difference between the virtual target TM input torque, computed by the virtual target TM input torque computation part 81, and the minimum torque, and a divider 115 that obtains a virtual target volumetric efficiency by dividing an output of the subtracter 114 by an output of the subtracter 113.

The configuration of the virtual target TM input torque lower limit correction value computation part 83 in FIG. 9 illustrates a simplified calculation method making use of the fact that the volumetric efficiency and the engine torque have a linear relationship. In other words, the virtual target volumetric efficiency is computed by having the subtracter 114 determine the difference between the virtual target TM input torque and the minimum torque, and having the divider 115 divide the resulting determined value by the difference between the maximum torque and the minimum torque.

The engine torque is determined univocally from the engine rotation speed and the volumetric efficiency, and therefore the target TM input torque lower limit correction value can likewise be determined directly by storing a three-dimensional map of the target TM input torque lower limit correction value, the map having the engine rotation speed and the volumetric efficiency as parameters, in advance in the ROM, and searching the map using the engine rotation speed and the volumetric efficiency.

Figure 10:
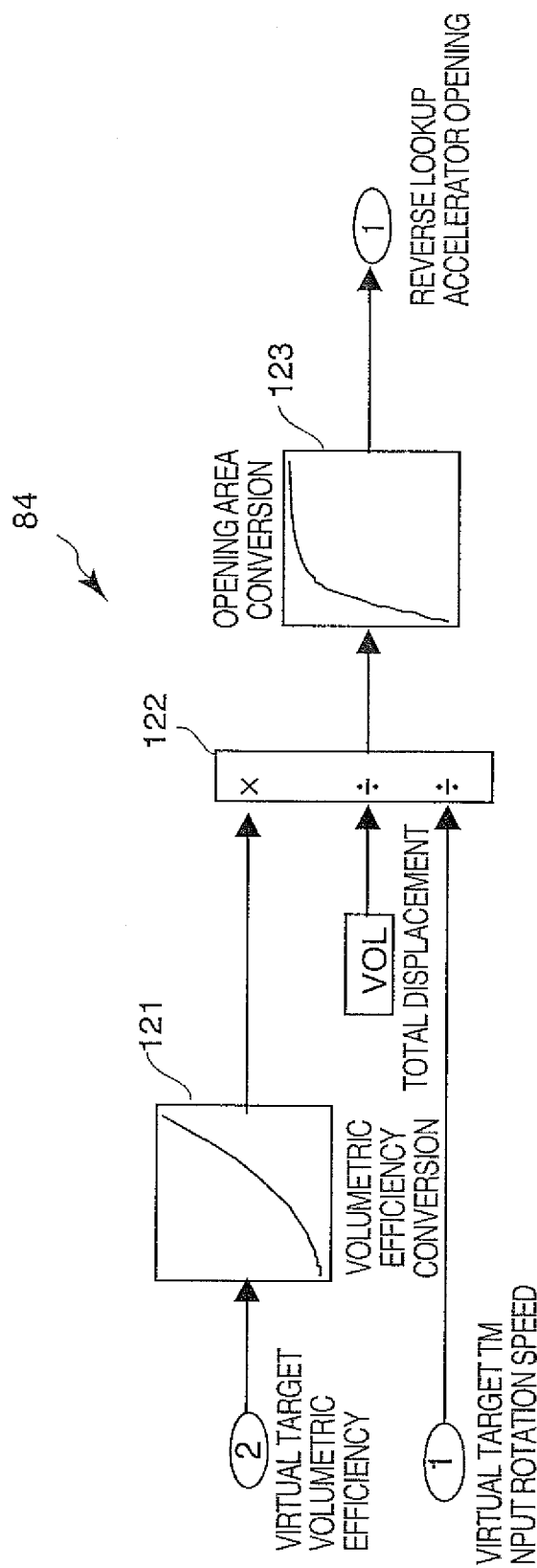
FIG. 10 is a block diagram illustrating a configuration of a reverse lookup accelerator opening output part provided in the reverse lookup accelerator opening computation part.

FIG. 10 shows a configuration of the reverse lookup accelerator opening output part 84.

Referring to FIG. 10, the reverse lookup accelerator opening output part 84 comprises a volumetric efficiency reverse conversion part 121, a divider 122, and an opening area conversion part 123.

The volumetric efficiency reverse conversion part 121 converts the virtual target volumetric efficiency output by the virtual target volumetric efficiency computation part 83 into a virtual target opening area of the intake throttle device 3 by referring to a map stored in advance in the ROM of the computer 21. The divider 122 computes a unit virtual target opening area per unit exhaust gas amount and per unit rotation by dividing the virtual target opening area by an exhaust gas amount of the internal combustion engine 1 and the virtual target input rotation speed. The opening area conversion part 123 determines the accelerator opening from the unit virtual target opening area by referring to a map stored in advance in the ROM of the controller 21. In other words, the reverse lookup accelerator opening output part 84 back-calculates an accelerator opening at which the virtual target volumetric efficiency and the virtual target TM input rotation speed are obtained. The resulting obtained value will be referred to as a reverse lookup accelerator opening.

This concludes description of the reverse lookup accelerator opening computation part 72.

Next, the target drive force lower limit correction value computation and drive force decrease correction prevention determining part 73 will be described.

Figure 12:
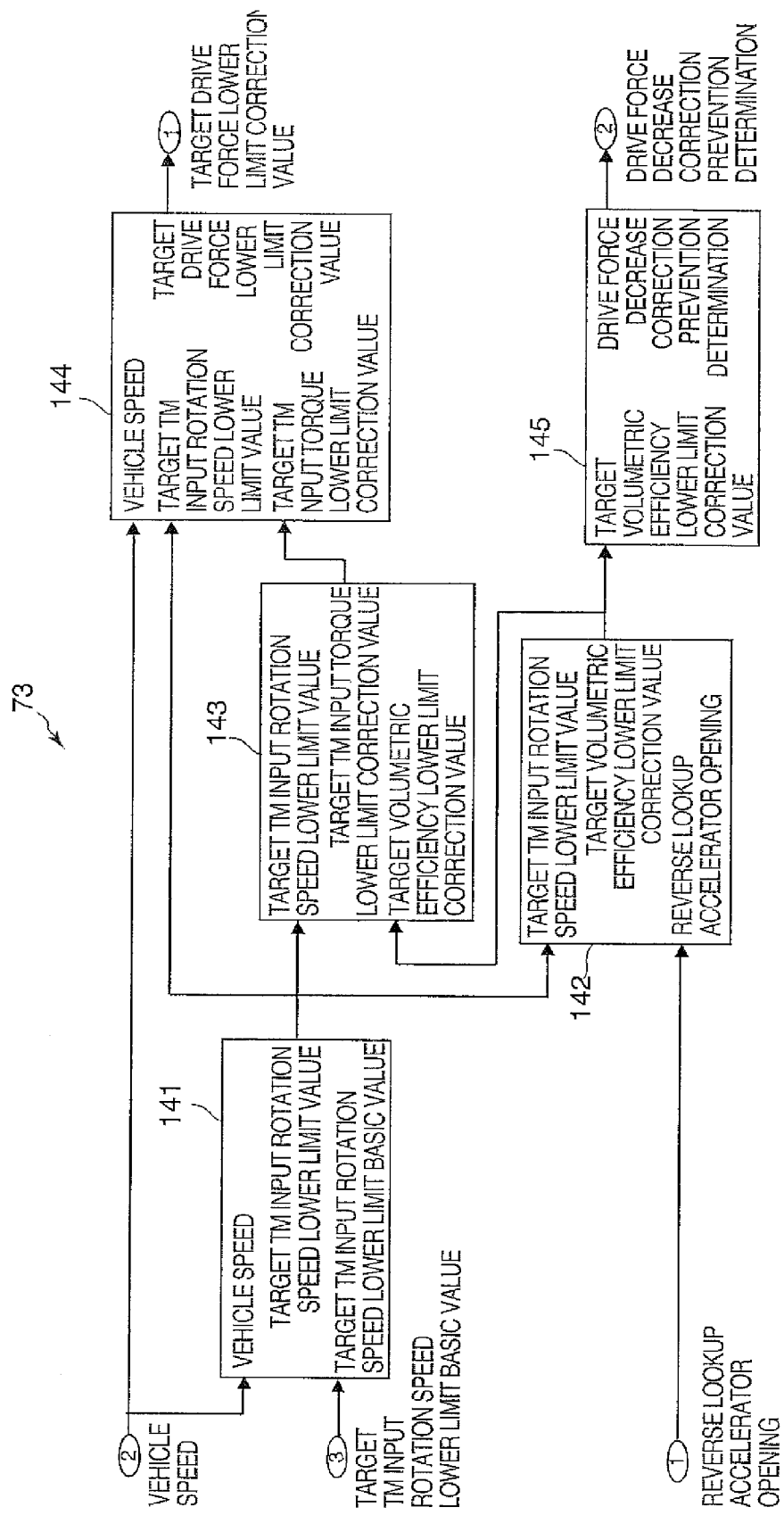
FIG. 12 is a block diagram illustrating a configuration of a target drive force lower limit correction value computation and drive force decrease correction prevention determining part provided in the target drive force computation part.

Referring to FIG. 12, the target drive force lower limit correction value computation and drive force decrease correction prevention determining part 73 is constituted by a target TM input rotation speed lower limit value computation part 141, a target volumetric efficiency lower limit correction value computation part 142, a target TM input torque lower limit correction value computation part 143, a target drive force lower limit correction value computation part 144, and a drive force decrease correction prevention determining part 145.

Figure 13:
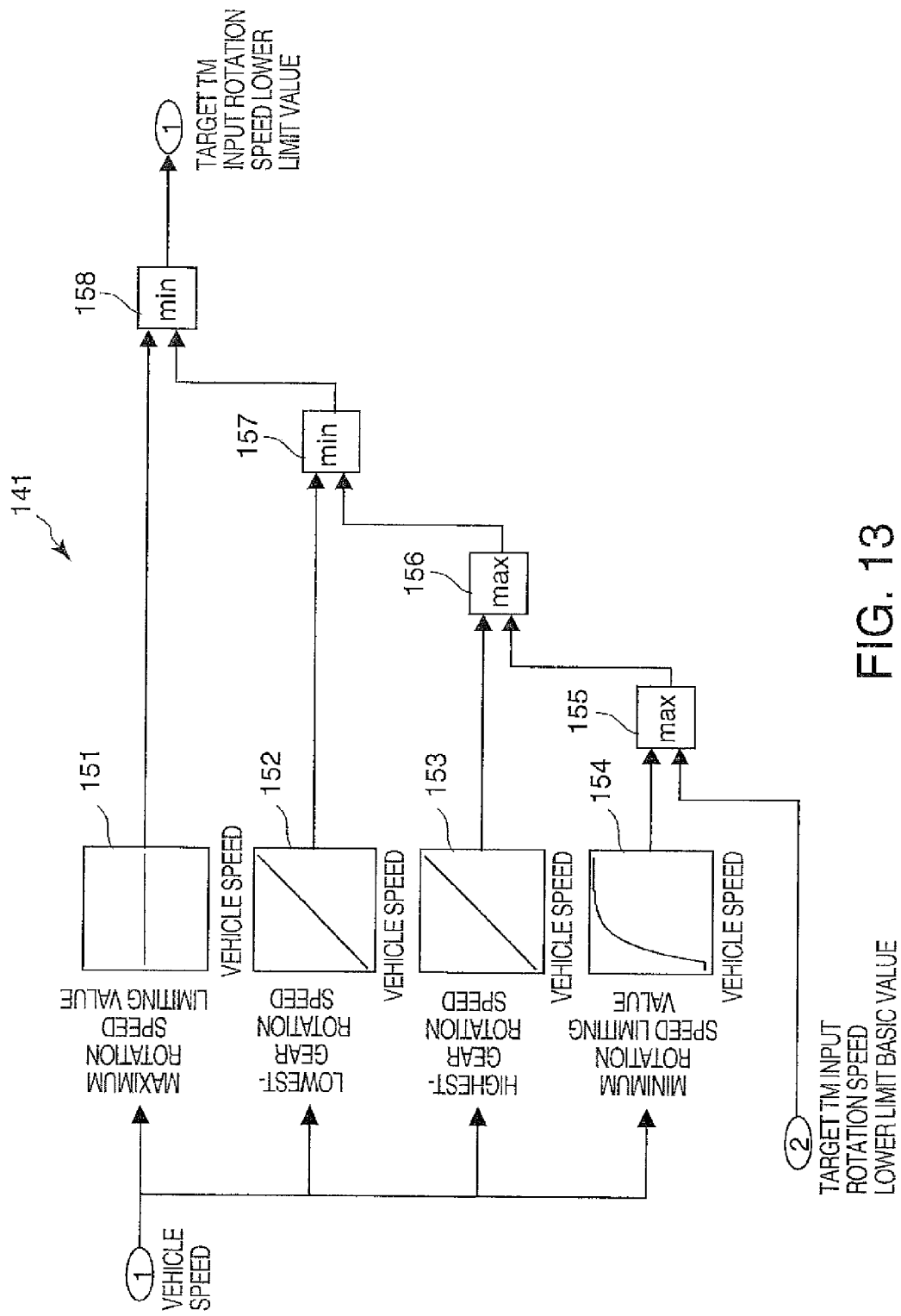
FIG. 13 is a block diagram illustrating a configuration of a target TM input rotation speed lower limit value computation part provided in the target drive force lower limit correction value computation and drive force decrease correction prevention determining part.

FIG. 13 shows a configuration of the target TM input rotation speed lower limit value computation part 141.

Referring to FIG. 13, the target TM input rotation speed lower limit value computation part 141 comprises a maximum rotation speed limiting value computation part 151, a lowest-gear rotation speed computation part 152, a highest-gear rotation speed computation part 153, a minimum rotation speed limiting value computation part 154, maximum value output circuits 155 and 156, and minimum value output circuits 157 and 158.

The maximum rotation speed limiting value computation part 151 sets a maximum rotation speed limiting value from a maximum rotation speed of the internal combustion engine 1. The lowest-gear rotation speed computation part 152 computes a TM input rotation speed corresponding to the lowest speed ratio of the CVT 12 from the vehicle speed and the lowest speed ratio as a lowest-gear rotation speed. The highest-gear rotation speed computation part 153 computes a TM input rotation speed corresponding to the highest speed ratio of the CVT 12 from the vehicle speed and the highest speed ratio as a highest-gear rotation speed. The minimum rotation speed limiting value computation part 154 sets a minimum rotation speed limiting value corresponding to the vehicle speed from a minimum rotation speed of the internal combustion engine 1.

The maximum value output circuit 155 compares the target TM input rotation speed lower limit basic value computed by the target TM input rotation speed lower limit basic value computation part 51 with the minimum rotation speed limiting value, and outputs the larger thereof. In other words, a lower limit of the target TM input rotation speed lower limit basic value is limited by the minimum rotation speed limiting value.

The maximum value output circuit 156 compares the output of the maximum value output circuit 155 with the highest-gear rotation speed, and outputs the larger thereof. In other words, a lower limit of the output of the maximum value output circuit 155 is limited by the highest-gear rotation speed.

The minimum value output circuit 157 compares the output of the maximum value output circuit 156 with the lowest-gear rotation speed, and outputs the smaller thereof. In other words, an upper limit of the maximum value output circuit 156 is limited by the lowest-gear rotation speed. The minimum value output circuit 158 compares the output of the minimum value output circuit 157 with the maximum rotation speed limiting value, and outputs the smaller thereof. In other words, an upper limit of the minimum value output circuit 157 is limited by the maximum rotation speed limiting value.

Hence, the target TM input rotation speed lower limit value computation part 141 outputs a value to which limitations based on specifications of the internal combustion engine 1 and the CVT 12 have been added as the target TM input rotation speed lower limit value.

Figure 14:
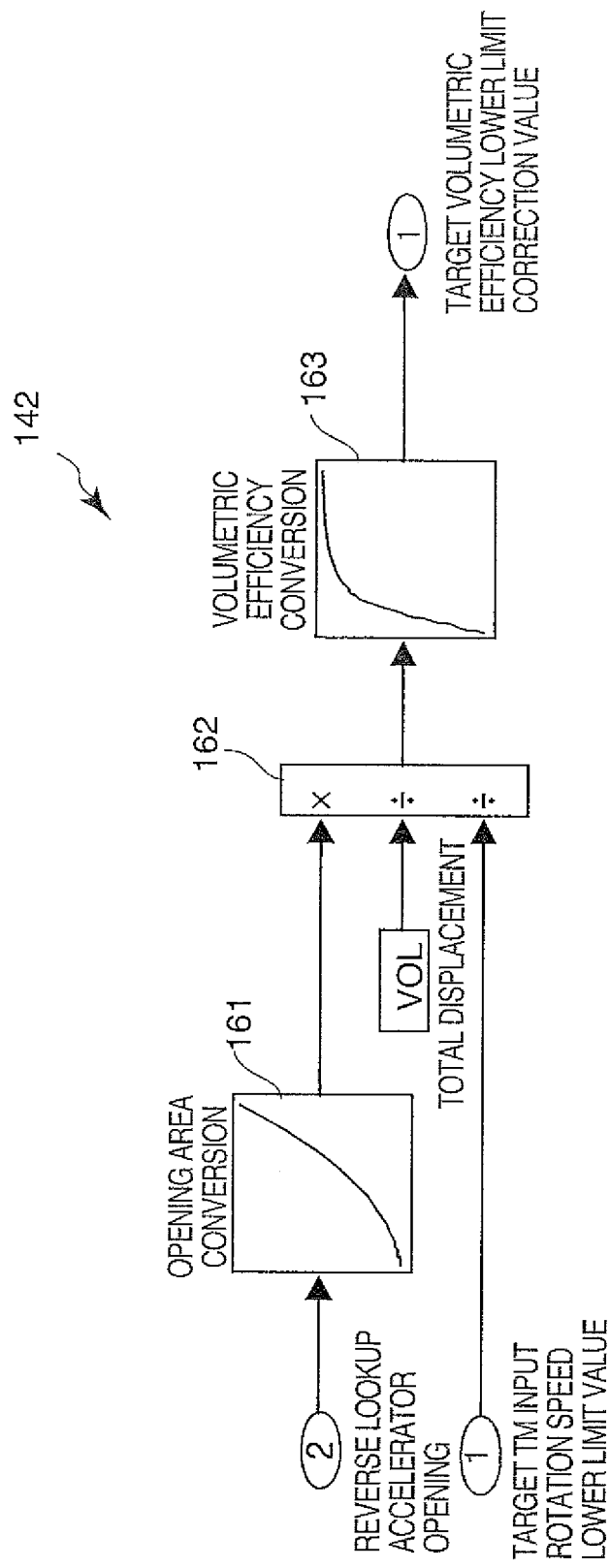
FIG. 14 is a block diagram illustrating a configuration of a target volumetric efficiency lower limit correction value computation part provided in the target drive force lower limit correction value computation and drive force decrease correction prevention determining part.

FIG. 14 shows a configuration of the target volumetric efficiency lower limit correction value computation part 142.

Referring to FIG. 14, the target volumetric efficiency lower limit correction value computation part 142 comprises an opening area conversion part 161, a divider 162, and a volumetric efficiency conversion part 163.

The opening area conversion part 161 converts the reverse lookup accelerator opening computed by the reverse lookup accelerator opening computation part 72 into an opening area of the intake throttle device 3 by referring to a map stored in advance in the ROM of the controller 21. The divider 162 computes a unit opening area per unit exhaust gas amount and per unit rotation by dividing the opening area by the exhaust gas amount of the internal combustion engine 1 and the target TM input rotation speed lower limit value computed by the target TM input rotation speed lower limit value computation part 141. The volumetric efficiency conversion part 163 computes a target volumetric efficiency lower limit correction value from the unit opening area computed by the divider 162 by referring to a map stored in advance in the ROM of the controller 21.

Figure 15:
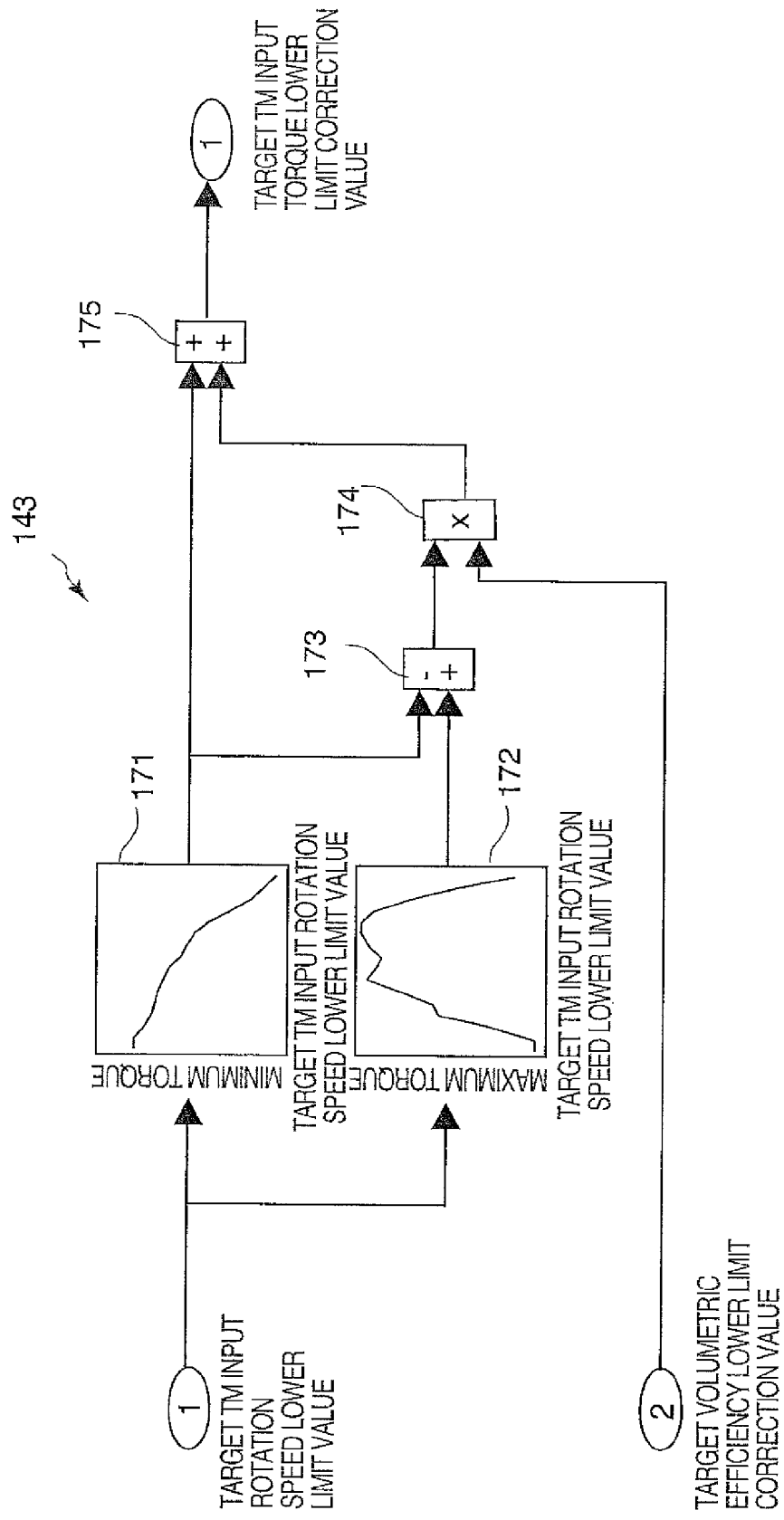
FIG. 15 is a block diagram illustrating a configuration of a target TM input torque lower limit correction value computation part provided in the target drive force lower limit correction value computation and drive force decrease correction prevention determining part.

FIG. 15 shows a configuration of the target TM input torque lower limit correction value computation part 143.

Referring to FIG. 15, the target TM input torque lower limit correction value computation part 143 comprises a minimum torque computation part 171, a maximum torque computation part 172, a subtracter 173, a multiplier 174, and an adder 175.

The minimum torque computation part 171 determines a minimum torque that can be input into the CVT 12 from the target TM input rotation speed lower limit value computed by the target TM input rotation speed lower limit value computation part 141 by referring to a map stored in advance in the ROM of the controller 21.

The maximum torque computation part 172 determines a maximum torque that can be input into the CVT 12 from the target TM input rotation speed lower limit value computed by the target TM input rotation speed lower limit value computation part 141 by referring to a map stored in advance in the ROM of the controller 21.

The subtracter 173 calculates a difference between the maximum torque and the minimum torque. The multiplier 174 multiplies the difference between the maximum torque and the minimum torque by the target volumetric efficiency lower limit correction value computed by the target volumetric efficiency lower limit correction value computation part 142. The adder 175 computes a target TM input torque lower limit correction value by adding an output of the multiplier 174 to the minimum torque.

The target TM input torque lower limit correction value is calculated by the target TM input torque lower limit correction value computation part 143, as described above, making use of the fact that a basically linear relationship exists between the volumetric efficiency and the engine torque of the internal combustion engine 1. The engine torque, on the other hand, is determined univocally from the rotation speed and the volumetric efficiency of the internal combustion engine, and therefore, according to one or more embodiments of the present invention, the target TM input torque lower limit correction value is determined from the target TM input rotation speed lower limit value and the target volumetric efficiency lower limit correction value by referring to a three-dimensional map on which the engine torque is plotted using the rotation speed and the volumetric efficiency as parameters, this map being stored in advance in the ROM of the controller 21.

Figure 16:
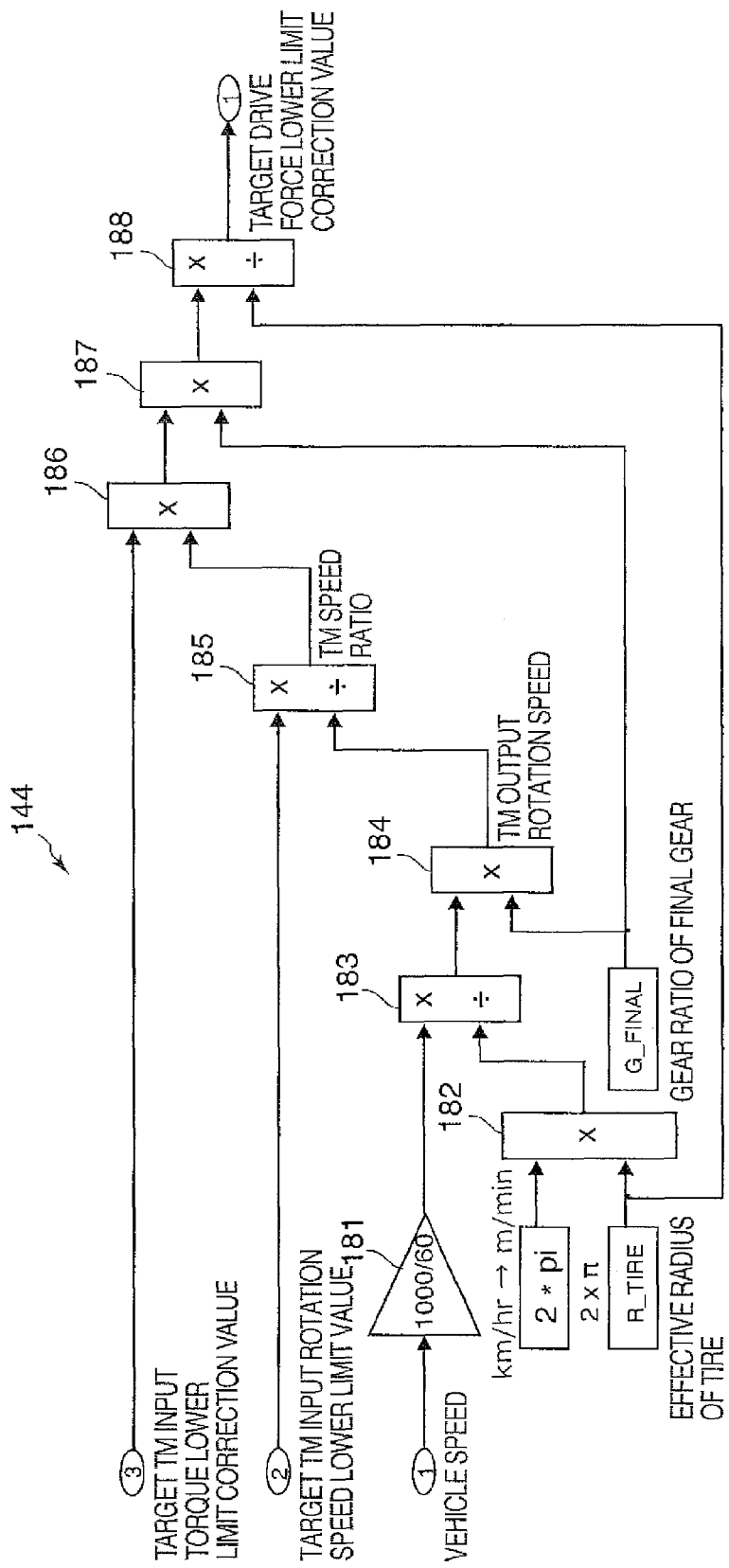
FIG. 16 is a block diagram illustrating a configuration of a target drive force lower limit correction value computation part provided in the target drive force lower limit correction value computation and drive force decrease correction prevention determining part.

FIG. 16 shows a configuration of the target drive force lower limit correction value computation part 144.

Referring to FIG. 16, the target drive force lower limit correction value computation part 144 comprises a unit converter 181, multipliers 182, 184, 186, 187, and dividers 183, 185, 188.

The unit converter 181 converts the vehicle speed into m/min units. The multiplier 182 calculates the circumferential distance of the tire from the diameter of the tire. The divider 183 calculates the rotation speed of the tire from the vehicle speed and the circumferential distance of the tire. The multiplier 184 calculates the output rotation speed of the CVT 12 by multiplying the gear ratio of the final gear 18 provided between the CVT 12 and the drive wheel of the vehicle by the rotation speed of the tire. The divider 185 converts the target TM input rotation speed lower limit value into a target speed ratio of the CVT 12 by dividing the target TM input rotation speed lower limit value by the output rotation speed of the CVT 12.

The multiplier 186 calculates a target output torque lower limit correction value of the CVT 12 by multiplying the target speed ratio of the CVT 12 by the target TM input torque lower limit correction value computed by the target TM input torque lower limit correction value computation part 143. The multiplier 187 calculates a final torque correction value by multiplying the final gear ratio by the target output torque lower limit correction value, and the divider 188 computes a target drive force lower limit correction value by dividing the final torque correction value by the effective tire radius R_TIRE.

Figure 17:
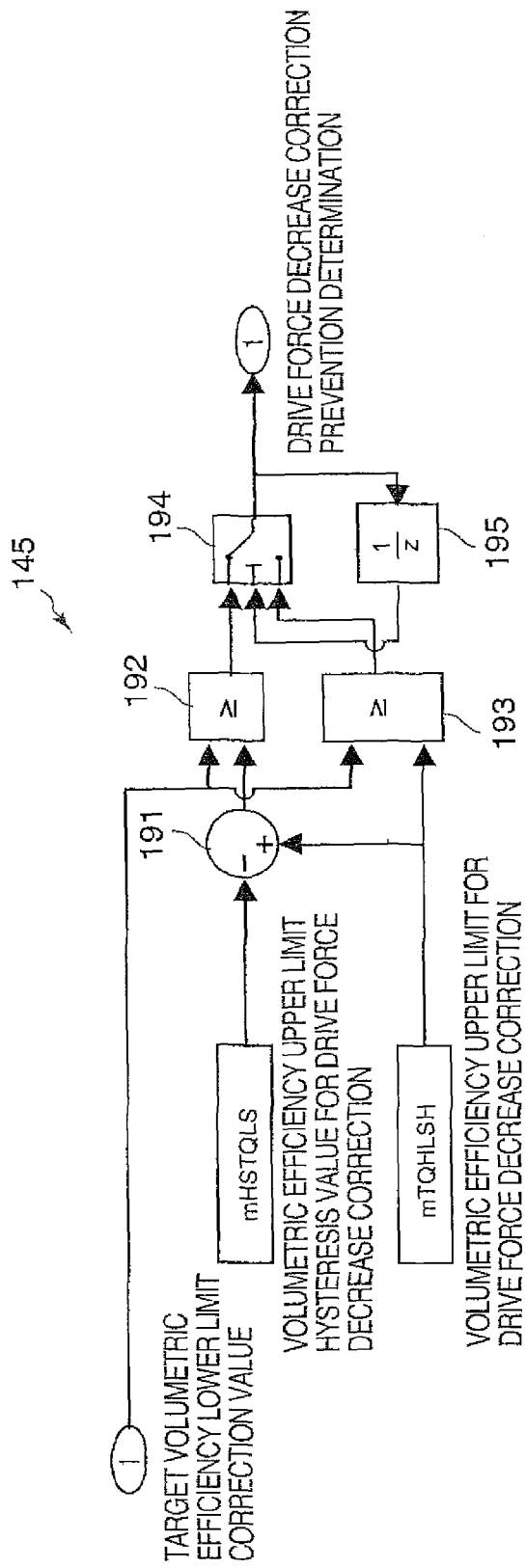
FIG. 17 is a block diagram illustrating a configuration of a drive force decrease correction prevention determining part provided in the target drive force lower limit correction value computation and drive force decrease correction prevention determining part.

FIG. 17 shows a configuration of the drive force decrease correction prevention determining part 145.

Referring to FIG. 17, the drive force decrease correction prevention determining part 145 comprises a subtracter 191, comparators 192 and 193, a switch 194, and a delay unit 195. The subtracter 191 inputs a value obtained by subtracting a hysteresis value mHSTOLS from a drive force decrease correction implementation upper limit volumetric efficiency mTQHLSH into the comparator 192 as a comparison value. The comparator 192 determines whether or not the target volumetric efficiency lower limit correction value computed by the target volumetric efficiency lower limit correction value computation part 142 equals or exceeds the comparison value, and inputs a determination result into the switch 194 in the form of a Boolean value indicating YES/NO.

The comparator 193, meanwhile, determines whether or not the target volumetric efficiency lower limit correction value computed by the target volumetric efficiency lower limit correction value computation part 142 equals or exceeds the drive force decrease correction implementation upper limit volumetric efficiency mTQHLSH, and outputs a determination result to the switch 194 in the form of a Boolean value indicating YES/NO. The switch 194 switches between the input value from the comparator 192 and the input value from the comparator 193 using a previous drive force decrease correction prevention determination result, which is input via the delay unit 195, as a trigger.

To summarize the processing content of the drive force decrease correction prevention determining part 145, basically, the drive force decrease correction prevention determining part 145 determines whether or not the target volumetric efficiency lower limit correction value output by the target volumetric efficiency lower limit correction value computation part 142 equals or exceeds the drive force decrease correction implementation upper limit volumetric efficiency mTQHLSH, and prevents a drive force decrease correction when the determination is affirmative. In other words, to ensure that a drive force decrease correction is performed only during deceleration in a low load condition, a determination as to whether or not the load equals or exceeds a medium load is made using a volumetric efficiency, and in a region where the load equals or exceeds a medium load, the drive force decrease correction is prevented.

Furthermore, when the target volumetric efficiency lower limit correction value equals or exceeds the drive force decrease correction implementation upper limit volumetric efficiency mTQHLSH after taking hysteresis into account, prevention of the drive force decrease correction is not cancelled until the target volumetric efficiency lower limit correction value falls below the comparison value obtained by subtracting the hysteresis value mHSTOLS from the drive force decrease correction implementation upper limit volumetric efficiency mTQHLSH.

This concludes description of the target drive force lower limit correction value computation and drive force decrease correction prevention determining part 73.

Figure 18:
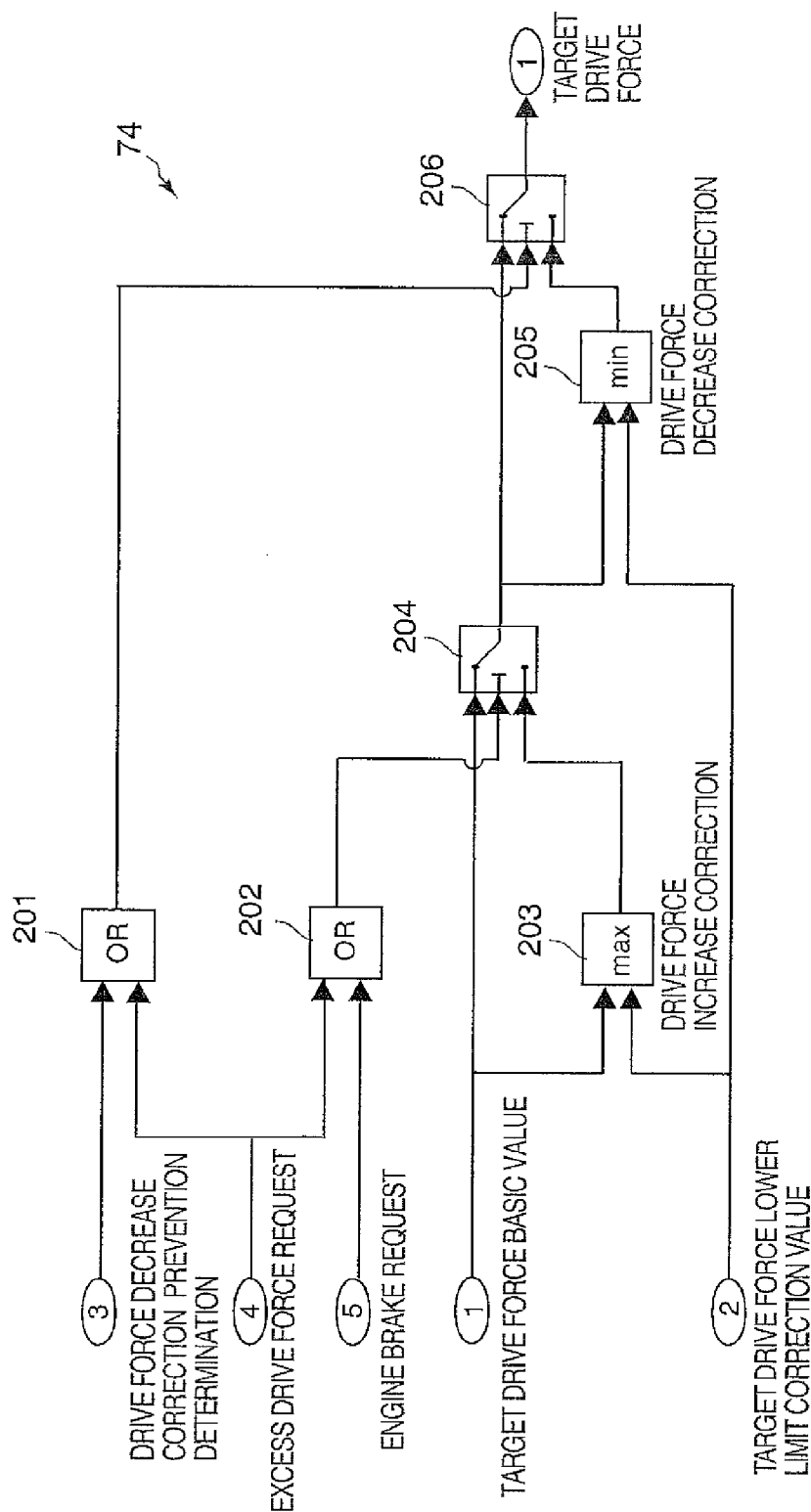
FIG. 18 is a block diagram illustrating a configuration of a target drive force output part provided in the target drive force computation part.

FIG. 18 shows a configuration of the target drive force output part 74.

Referring to FIG. 18, the target drive force output part 74 comprises OR circuits 201 and 202, a maximum value output circuit 203, switches 204 and 206, and a minimum value output circuit 205.

The OR circuit 201 outputs an ON signal when either the drive force decrease correction prevention determination result output by the target drive force lower limit correction value computation and drive force decrease correction prevention determining part 73 or the excess drive force request described above is ON. The OR circuit 202 outputs an ON signal when either the excess drive force request or the engine brake request is ON. The maximum value output circuit 203 outputs the larger of the target drive force basic value output by the target drive force basic value computation part 71 and the target drive force lower limit correction value output by the target drive force lower limit correction value computation and drive force decrease correction prevention determining part 73.

The switch 204 outputs the target drive force basic value when the output of the OR circuit 202 is ON, and outputs the output value of the maximum value output circuit 203 when the output of the OR circuit 202 is OFF. The minimum value output circuit 205 outputs the smaller of the output of the switch 204 and the target drive force lower limit correction value. The switch 206 outputs the output value of the switch 204 as a target drive force when the output of the OR circuit 201 is ON, and outputs the output of the minimum value output circuit 205 as the target drive force when the output of the OR circuit 201 is OFF.

To summarize the above, the target drive force output part 74 performs a target drive force correction based on the target drive force lower limit correction value on the basis of various requests, such as the engine brake request and the excess drive force request, used by the target TM input rotation speed lower limit basic value computation part 51 to calculate the target TM input rotation speed lower limit basic value.

More specifically, when the excess drive force request or the engine brake request is issued, the target drive force output part 74 prevents a drive force increase correction. When the drive force decrease correction has been prevented or the excess drive force request is issued, the drive force decrease correction is prevented. As a result, both the drive force increase correction and the drive force decrease correction are prevented when the excess drive force request is issued. In this case, the engine rotation speed alone is corrected to an increase side in a separate routine, resulting in an increase in excess drive force. When the engine brake request is issued but the excess drive force request is not issued, correction of the drive force to the increase side is prevented.

Although not shown in the figures, neither the drive force increase correction nor the drive force decrease correction is prevented in response to the sport mode request, and as a result, corrections are applied in accordance with the target drive force lower limit correction value at all times.

This concludes description of the target drive force output part 74 and the target drive force computation part 52.

Figure 19:
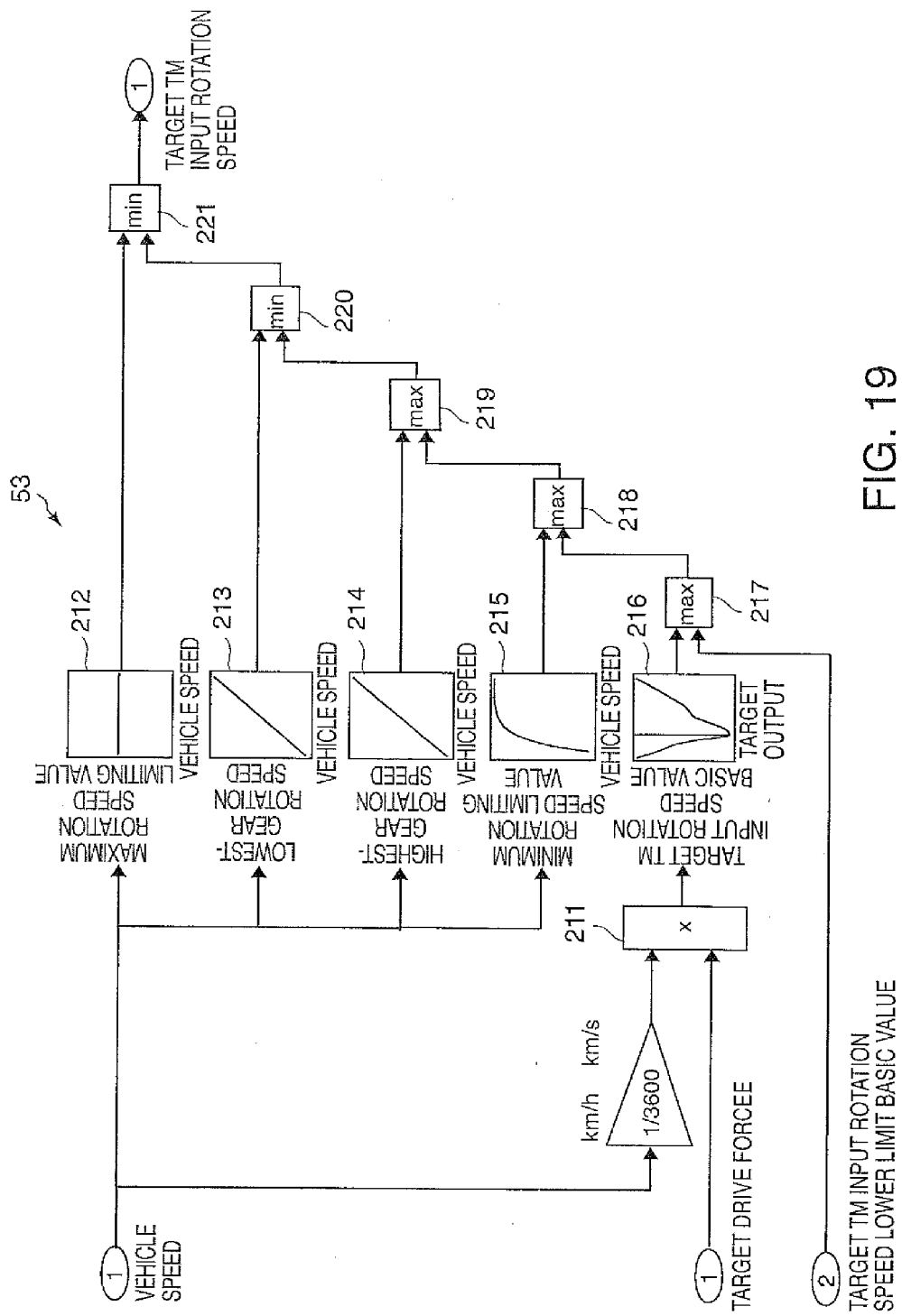
FIG. 19 is a block diagram illustrating a configuration of a target TM input rotation speed computation part provided in the target drive force generation part.

FIG. 19 shows a configuration of the target TM input rotation speed computation part 53.

Referring to FIG. 19, the target TM input rotation speed computation part 53 comprises a maximum rotation speed limiting value computation part 212, a lowest-gear rotation speed computation part 213, a highest-gear rotation speed computation part 214, a minimum rotation speed limiting value computation part 215, a multiplier 211, a target TM input rotation speed basic value computation part 216, maximum value output circuits 217 to 219, and minimum value output circuits 220 and 221.

The maximum rotation speed limiting value computation part 212 outputs a maximum rotation speed limiting value, which is a fixed value stored in advance. The lowest-gear rotation speed computation part 213 calculates a lowest-gear rotation speed that can be input within the lowest gear ratio of the CVT 12 from the vehicle speed. The highest-gear rotation speed computation part 214 calculates a highest-gear rotation speed that can be input within the highest gear ratio of the CVT 12 from the vehicle speed. The minimum rotation speed limiting value computation part 215 calculates a minimum rotation speed limiting value in accordance with the vehicle speed. The multiplier 211 calculates a target output by multiplying the target drive force output by the target drive force computation part 52 by the vehicle speed, the vehicle speed having been converted into a speed per second. An output corresponding to a load of an accessory may also be added to the target output. Further, in the case of a hybrid electric vehicle (HEV), a target power generation output may also be added. The target TM input rotation speed basic value computation part 216 calculates the target TM input rotation speed basic value on the basis of the target output.

The maximum value output circuit 217 outputs the larger of the target TM input rotation speed basic value and the target TM input rotation speed lower limit basic value output by the target TM input rotation speed lower limit basic value computation part 51. The maximum value output circuit 218 outputs the larger of the output of the maximum value output circuit 217 and the minimum rotation speed limiting value output by the minimum rotation speed limiting value computation part 215. The maximum value output circuit 219 outputs the larger of the output of the maximum value output circuit 218 and the highest-gear rotation speed output by the highest-gear rotation speed computation part 214.

The minimum value output circuit 220 outputs the smaller of the output of the maximum value output circuit 219 and the lowest-gear rotation speed output by the lowest-gear rotation speed computation part 213. The minimum value output circuit 221 outputs the smaller of the output of the minimum value output circuit 220 and the maximum rotation speed limiting value, output by the maximum rotation speed limiting value computation part 212, as the target TM input rotation speed.

Figure 20:
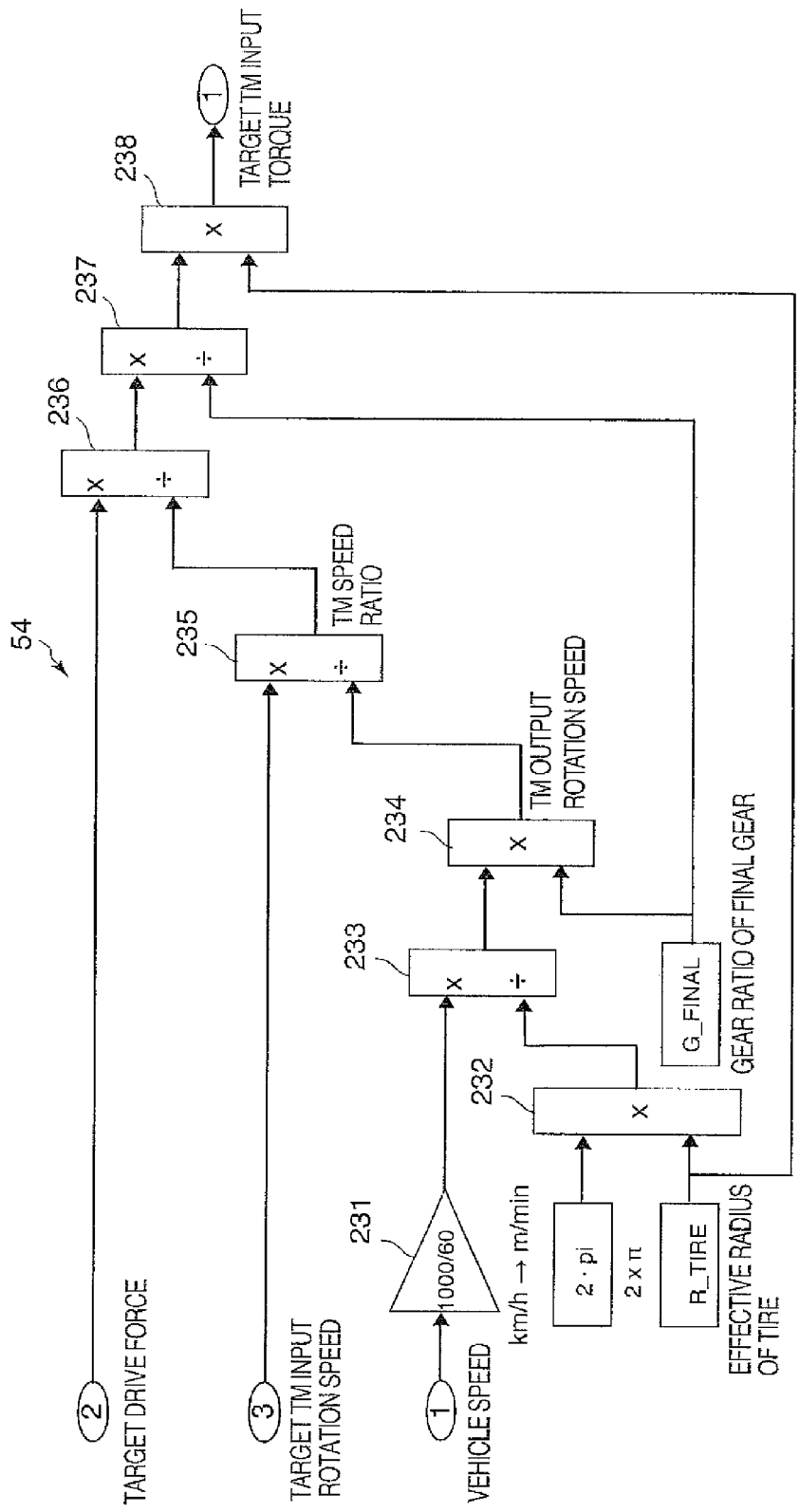
FIG. 20 is a block diagram illustrating a configuration of a target TM input torque computation part provided in the distribution computation part.

FIG. 20 shows a configuration of the target TM input torque computation part 54.

Referring to FIG. 20, the target TM input torque computation part 54 comprises a unit converter 231, multipliers 232, 234, and 238, and dividers 233 and 235 to 237. The unit converter 231 converts the vehicle speed into m/min units. The multiplier 232 calculates a circumferential length of the tire of the vehicle from the effective radius of the tire. The divider 233 computes the rotation speed of the tire by dividing the vehicle speed (m/min) by the circumferential length of the tire. The multiplier 234 computes the TM output rotation speed of the CVT 12 by multiplying the final gear ratio by the rotation speed of the tire. The divider 235 computes the TM speed ratio of the CVT 12 from a ratio between the target TM input rotation speed computed by the target TM input rotation speed computation part 53 and the TM output rotation speed. The dividers 236 and 237 compute a TM target input drive force by dividing the target drive force computed by the target drive force computation part 52 by the TM speed ratio and the final gear ratio. The multiplier 238 computes a target TM input torque by multiplying the effective radius of the tire by the TM target input drive force.

According to the target TM input torque computation part 54, when the target TM input rotation speed is corrected alone without correcting the target drive force, the target TM input torque varies, but this variation does not lead to variation in the drive force of the vehicle. In other words, an excess torque of the internal combustion engine varies while the drive force of the vehicle remains constant.

It should be noted that the actual TM input rotation speed detected by the primary pulley rotation speed sensor 24 may be used instead of the target TM input rotation speed. In this case, however, in consideration of a shift response delay in the CVT 12, according to one or more embodiments of the present invention, processing is performed to compensate for the response delay when calculating the target TM input torque in order to realize the target drive force.

The controller 21 computes the target TM input torque and the target TM input rotation speed through the processes described above. The controller 21 obtains the target TM input torque using a conventional method by operating the electric motor 5 of the intake throttle device 3 so as to controls the throttle opening. Further, the controller 21 obtains the target TM input rotation speed by controlling the gear ratio the CVT 12.

In the drive force control device described above, the target drive force computation part 52, the target TM input rotation speed computation part 53, the target TM input torque computation part 54, and the target TM input rotation speed lower limit basic value computation part 51 constitute target drive force computation means, target transmission input rotation speed computation means, target transmission input torque computation means, and individually required target transmission input rotation speed computation means, respectively.

In the drive force control device, a target drive force lower limit correction value is determined from the individually required target TM input rotation speed calculated on the basis of an individual request such as the sport mode request, the engine brake request, or the excess drive force request, whereupon the target drive force basic value based on the accelerator opening and the target drive force lower limit correction value are output selectively in accordance with the individual request.

Therefore, even when the target TM input rotation speed is corrected in response to an individual request, the target TM input torque is controlled in accordance with the individual request rather than being controlled univocally, and as a result, a similar degree of sensitivity to that achieved by ETD control can be realized in the target TM input torque in relation to variation in the target TM input rotation speed. In other words, the drive force can be manipulated in a similar manner to ETD control during PTD control.

Further, in comparison with a case where the target TM input torque is calculated using the target rotation speed prior to correction, as in the prior art, tendencies of the drive force to deviate from the target drive force and exhibit excessive increase sensitivity are eliminated, and as a result, favorable drivability can be realized.

In the drive force control device, the target drive force lower limit correction value is computed on the basis of the individually required target transmission input rotation speed and the accelerator opening, and therefore drive force variation corresponding to driver expectations can be realized.

In the drive force control device, the target TM input rotation speed lower limit basic value computation part 51 serving as the individually required target transmission input rotation speed computation means comprises the target TM input rotation speed lower limit basic value search part 61 that serves as target transmission input rotation speed lower limit basic value computation means in order to determine the target TM input rotation speed lower limit basic value from the vehicle speed. Further, the target volumetric efficiency lower limit correction value computation part 142, the target TM input torque lower limit correction value computation part 143, and the target drive force lower limit correction value computation part 144 are provided as target drive force lower limit correction value computation means in order to compute the target drive force lower limit correction value on the basis of the target transmission input rotation speed lower limit value and the accelerator opening.

Therefore, drive force variation corresponding to driver expectations can be realized from the target transmission input rotation speed computed on the basis of the target transmission input rotation speed lower limit value and the target drive force computed on the basis of the target drive force lower limit value.

The target TM input torque lower limit correction value computation part 143 functions as target transmission input torque lower limit correction value computation means for computing a target transmission input torque lower limit correction value on the basis of the target transmission input rotation speed lower limit value and the accelerator opening. The target drive force lower limit correction value computation part 144 functions as target drive force lower limit correction value computation means for computing a target drive force lower limit correction value on the basis of the target transmission input torque lower limit correction value.

By determining the target transmission input torque lower limit correction value on the basis of the target transmission input rotation speed lower limit value and the accelerator opening in this manner, a similar torque characteristic to that of ETD control can be realized easily and appropriately, and as a result, drive force variation that does not cause discomfort can be realized.

Furthermore, the target drive force computation part 52, which serves as target drive force correcting means, is configured to determine whether or not to implement a target drive force correction based on the target drive force lower limit correction value, and to correct the target drive force on the basis of the determination result. Therefore, correction of the lower limit rotation speed of the TM input rotation speed can be controlled independently of the drive force variation that accompanies this correction. As a result, an improvement in the freedom of drivability-related control is achieved in comparison with conventional PTD control. For example, the excess drive force can be manipulated through control to increase the TM input rotation speed alone.

Moreover, the target drive force output part 74, which serves as target drive force lower limit correction implementation determining means, functions as increase correction implementation determining means for determining whether or not to implement an increase correction of the target drive force basic value. The target drive force lower limit correction value computation and drive force decrease correction prevention determining part 73, which also serves as the target drive force lower limit correction implementation determining means, functions as decrease correction implementation determining means for determining whether or not to implement a decrease correction of the target drive force basic value. Therefore, the drive force can be corrected to the drive force increase side or the drive force decrease side as required, and as a result, a high degree of freedom is obtained in relation to drivability control. For example, drive force control can be performed in response to the engine brake request alone.

Furthermore, the target drive force computation part 52 serving as the target drive force correcting means is configured to compute the target volumetric efficiency lower limit correction value on the basis of the target transmission input rotation speed lower limit value and the accelerator opening, while the target drive force lower limit correction value computation and drive force decrease correction prevention determining part 73 serving as the decrease correction implementation determining means of the target drive force lower limit correction implementation determining means is configured to determine whether or not to implement a decrease correction on the basis of the target volumetric efficiency lower limit correction value.

As a result, a condition in which the drive force decrease correction should not be performed, or in other words a high load region in which the drivability may deteriorate if the decrease correction is performed, can be determined easily and appropriately and reflected in control of the drive force.

Further, the drive force control device uses the reverse lookup accelerator opening, which is computed from the target drive force basic value, as the accelerator opening used to calculate target drive force lower limit correction value. Therefore, even when the target drive force basic value is set arbitrarily, the drive force can be made to vary in response to variation in the TM input rotation speed with an appropriate degree of sensitivity.

Next, a drive force control device for a vehicle according to a second embodiment of the present invention will be described. The second embodiment differs from the first embodiment in the configuration of the target drive force computation part 52, but all other configurations are identical to the first embodiment.

Figure 21:
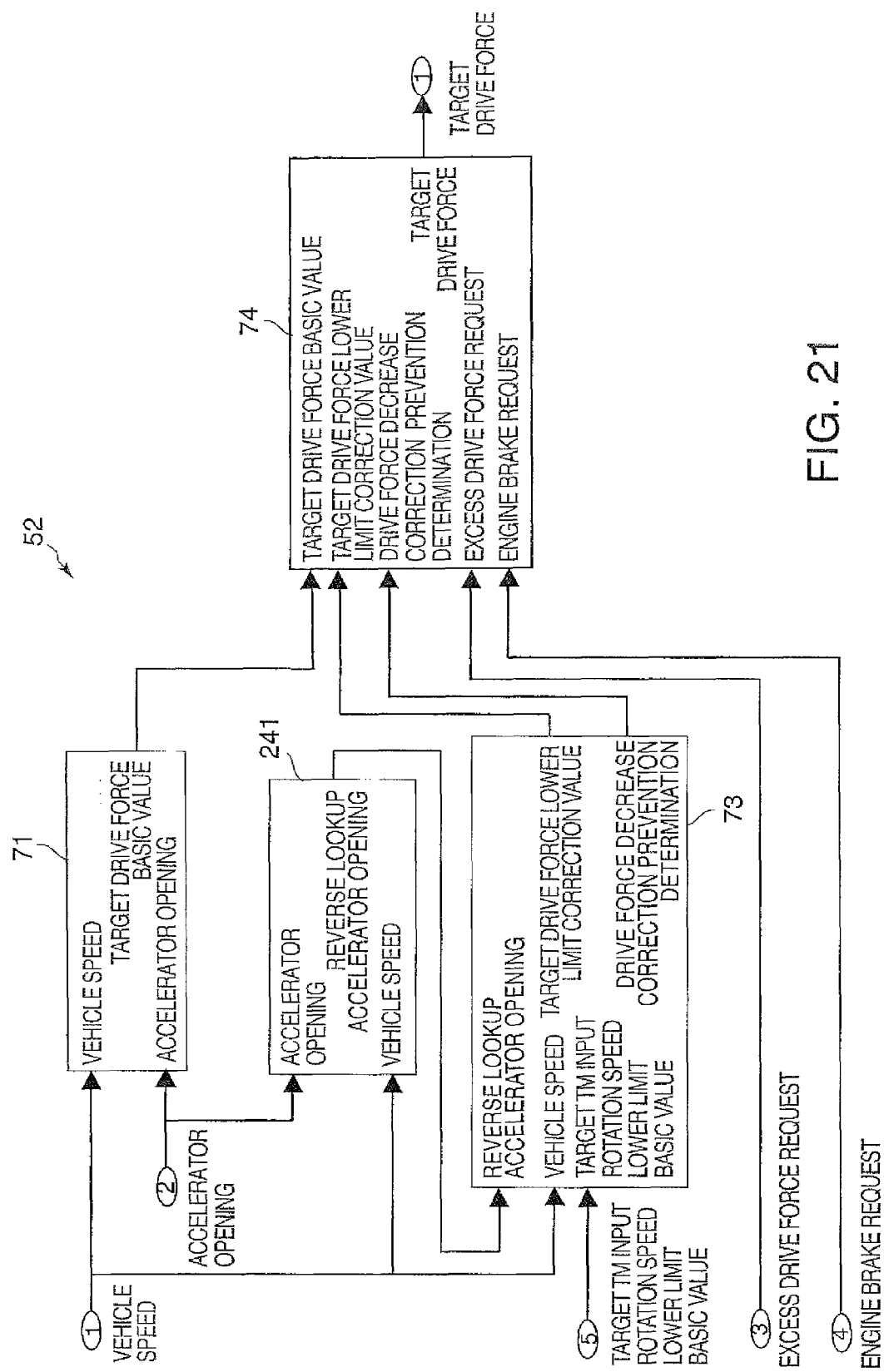
FIG. 21 is a block diagram illustrating a configuration of a target drive force computation part according to a second embodiment of the present invention.

Referring to FIG. 21, the target drive force computation part 52 according to the second embodiment comprises the target drive force basic value computation part 71, a reverse lookup accelerator opening computation part 241, the target drive force lower limit correction value computation and drive force decrease correction prevention determining part 73, and a target drive force output part 74.

Figure 22:
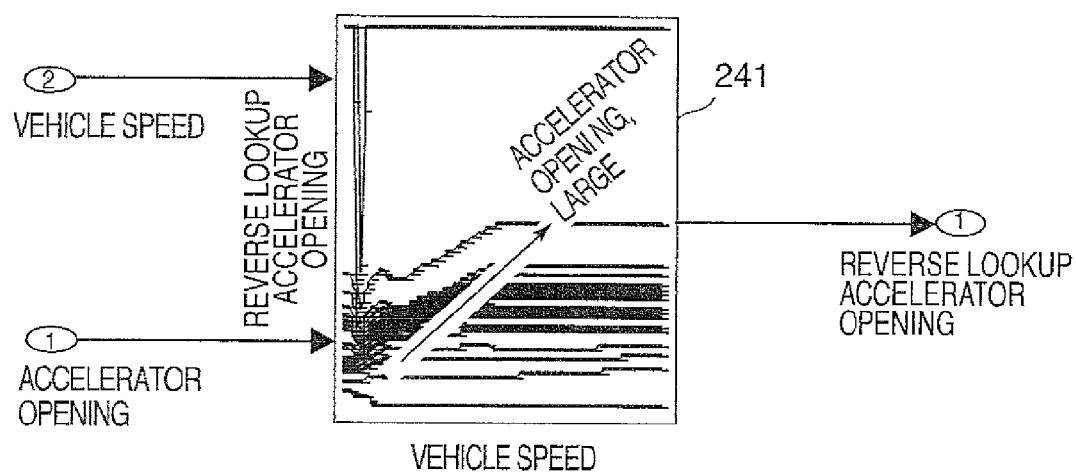
FIG. 22 is a block diagram illustrating a configuration of a reverse lookup accelerator opening computation part according to the second embodiment of the present invention.

Referring to FIG. 22, the reverse lookup accelerator opening computation part 241 computes the reverse lookup accelerator opening from the vehicle speed and the accelerator opening by referring to a map having content shown in the figure, the map being stored in advance in the ROM of the controller 21.

The reverse lookup accelerator opening computation part 72 according to the first embodiment calculates the reverse lookup accelerator opening on the basis of the vehicle speed and the target drive force basic value. Here, as shown in FIG. 11, the target drive force basic value is determined univocally from the vehicle speed and the accelerator opening. Further, as is evident from the configuration of the reverse lookup accelerator opening computation part 72 shown in FIG. 6, the reverse lookup accelerator opening is determined univocally from the vehicle speed and the target drive force basic value. Hence, the reverse lookup accelerator opening can be set in advance in the form of a map having the vehicle speed and the accelerator opening as parameters. The map shown in FIG. 22 serves as this map. The reverse lookup accelerator opening computation part 241 obtains the reverse lookup accelerator opening directly from the vehicle speed and the accelerator opening by referring to the map.

According to the second embodiment, the configurations of the reverse lookup accelerator opening computation part 72 and the target drive force computation part 52 can be simplified.

Referring to FIGS. 23-32, a drive force control device for a vehicle according to a third embodiment of the present invention will be described.

The third embodiment is applied to a vehicle in which an automatic shift mode and a manual mode are applied in accordance with a selection made by the driver. Here, in the manual mode, fixed speed ratios from a first speed to sixth speed are set, and these speed ratios are applied in response to driver operations. The third embodiment relates to application of the drive force control device to the manual mode.

Figure 23:
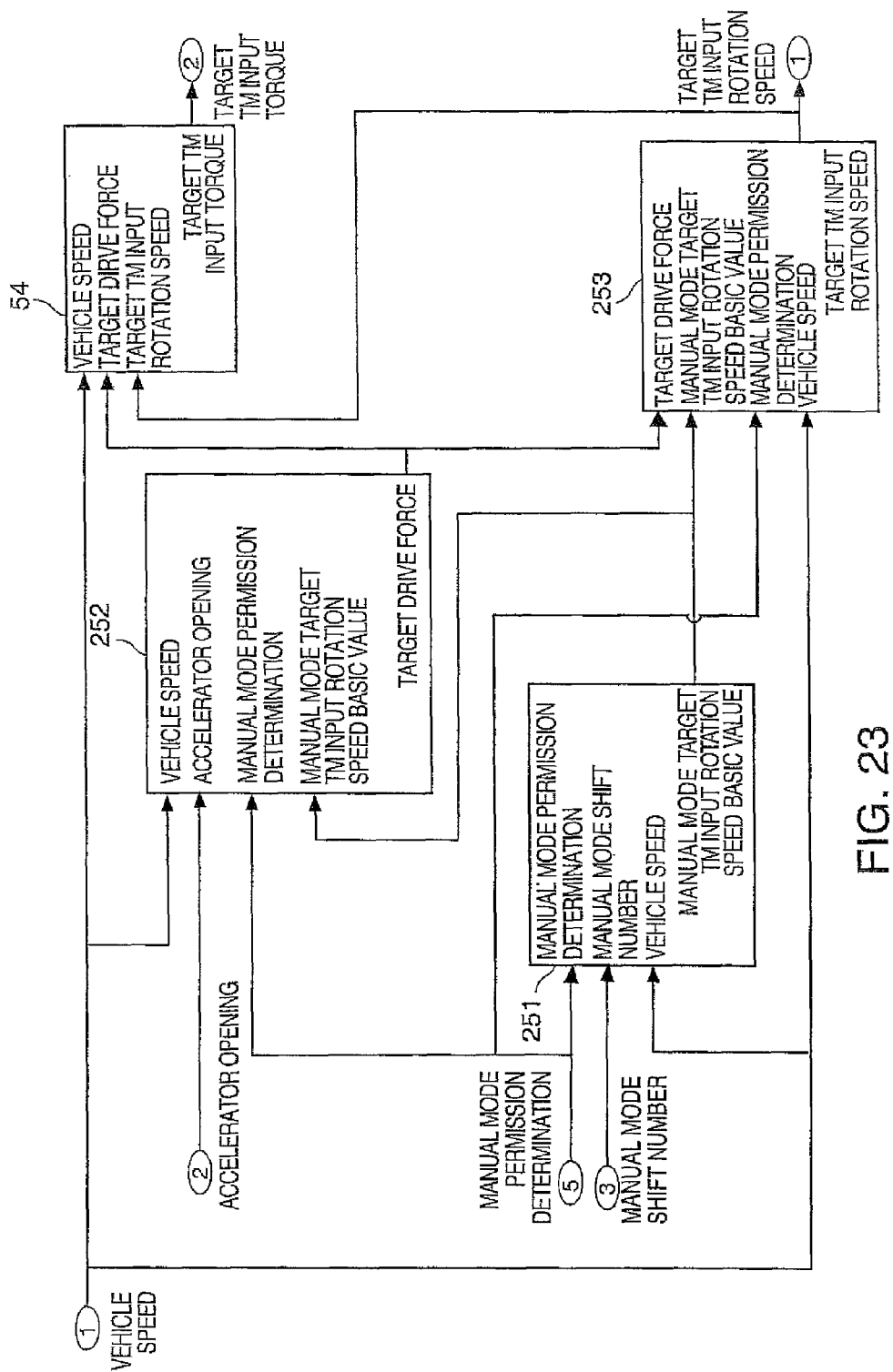
FIG. 23 is a block diagram illustrating a configuration of a controller according to a third embodiment of the present invention.

Referring to FIG. 23, the controller 21 according to the third embodiment comprises a manual mode TM input rotation speed basic value computation part 251, a target drive force computation part 252, a target TM input rotation speed computation part 253, and the target TM input torque computation part 54.

Figure 24:
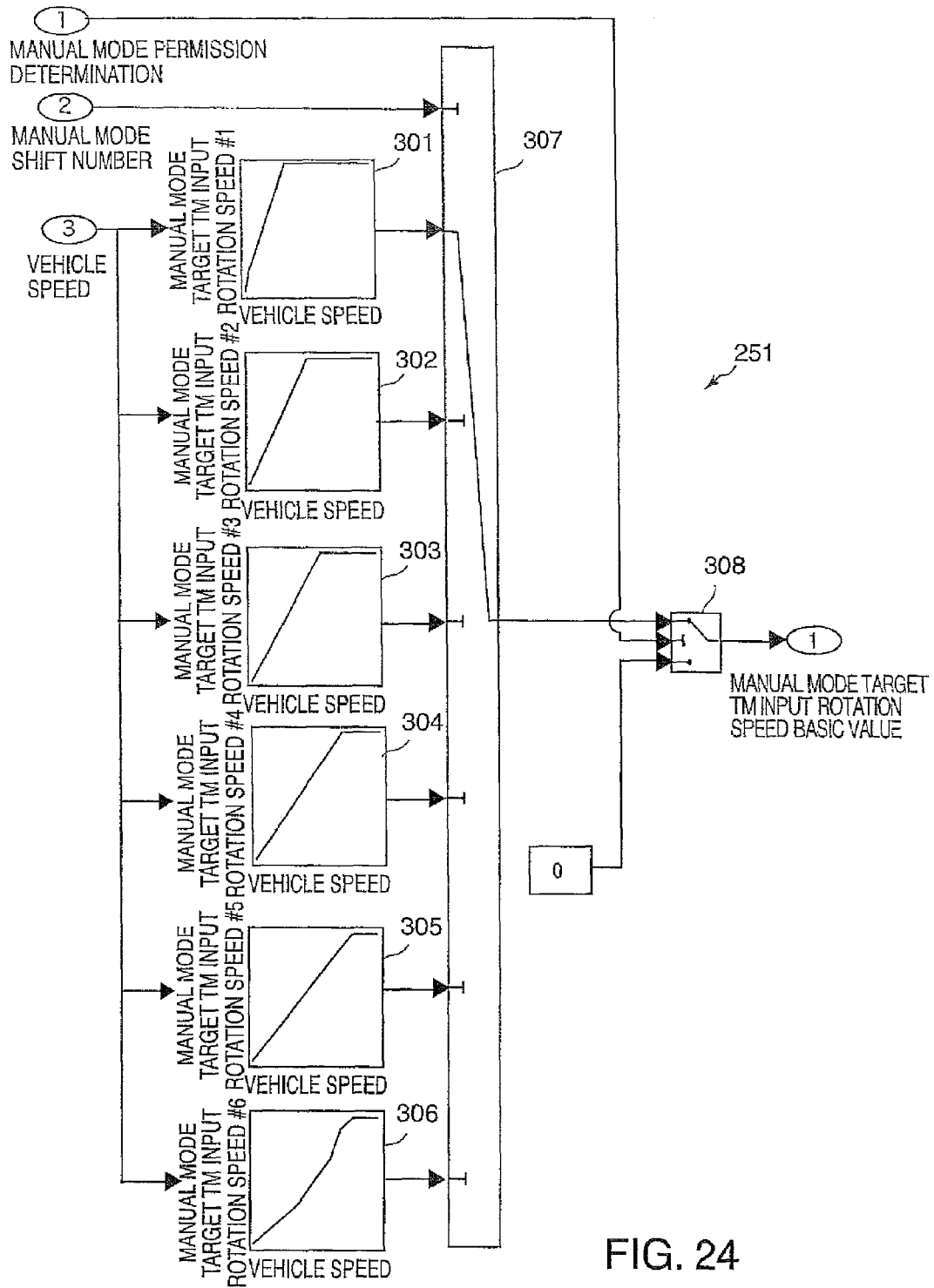
FIG. 24 is a block diagram illustrating a configuration of a manual mode target TM input rotation speed basic value computation part according to the third embodiment of the present invention.

FIG. 24 shows a configuration of the manual mode TM input rotation speed basic value computation part 251.

As shown in FIG. 24, the manual mode TM input rotation speed basic value computation part 251 comprises manual mode target TM input rotation speed computation parts #1 to #6 (member numerals 301 to 306), a selector 307, and a switch 308. The manual mode target TM input rotation speed computation parts #1 to #6 compute target TM input rotation speeds from the vehicle speed and gear ratios of the first speed to the sixth speed, respectively. The selector 307 outputs a computation result that corresponds to a manual mode shift number signal from an inhibitor switch provided in the vehicle, among respective computation results of the manual mode target TM input rotation speed computation parts #1 to #6. When a manual mode permission determination signal is ON, or in other words when application of the manual mode is permitted, the switch 308 outputs an output selected by the selector 307 as the target TM input rotation speed basic value, among the respective outputs of the manual mode target TM input rotation speed computation parts #1 to #6. When the manual mode permission determination signal is OFF, on the other hand, zero is output as the target TM input rotation speed basic value.

Figure 25:
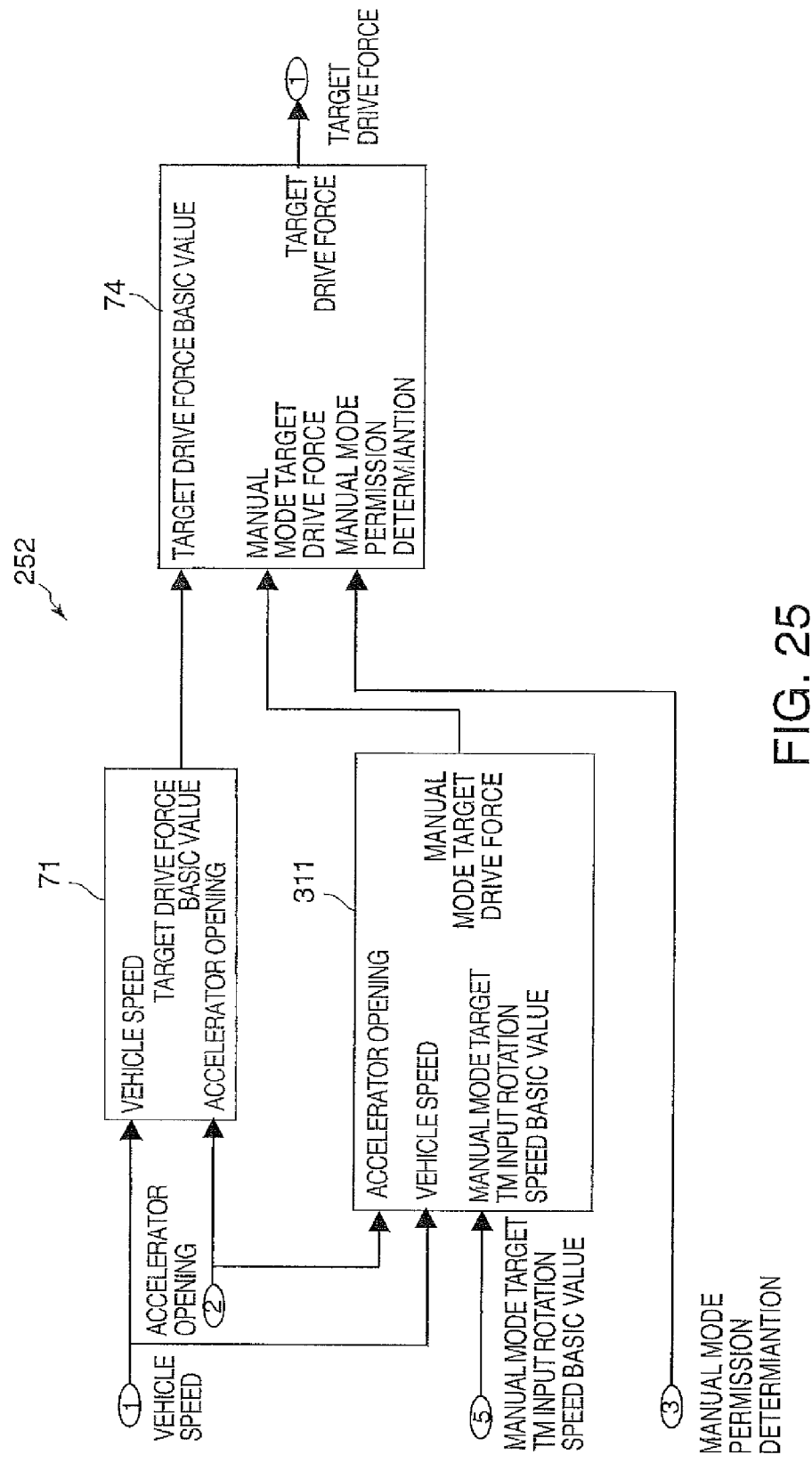
FIG. 25 is a block diagram illustrating a configuration of a target drive force computation part according to the third embodiment of the present invention.

FIG. 25 shows a configuration of the target drive force computation part 252.

As shown in FIG. 25, the target drive force computation part 252 comprises the target drive force basic value computation part 71, a manual mode target drive force computation part 311, and a target drive force output part 312. The target drive force basic value computation part 71 is configured identically to the target drive force basic value computation part 71 of the first embodiment.

Figure 26:
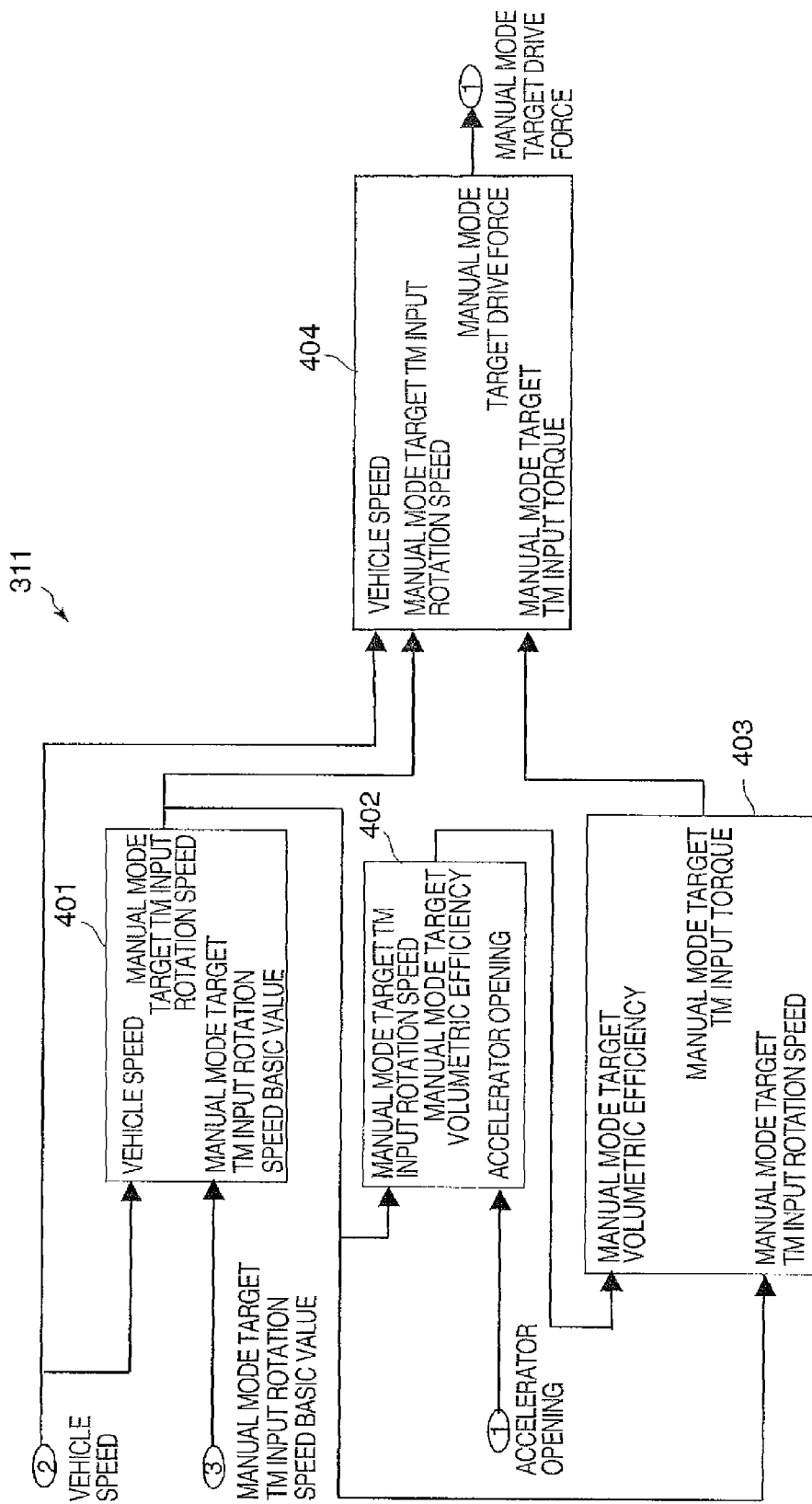
FIG. 26 is a block diagram illustrating a configuration of a manual mode target drive force computation part according to the third embodiment of the present invention.

FIG. 26 shows a configuration of the manual mode target drive force computation part 311.

Referring to FIG. 26, the manual mode target drive force computation part 311 comprises a manual mode target TM input rotation speed computation part 401, a manual mode target volumetric efficiency computation part 402, a manual mode target TM input torque computation part 403, and a manual mode target drive force output part 404.

Figure 27:
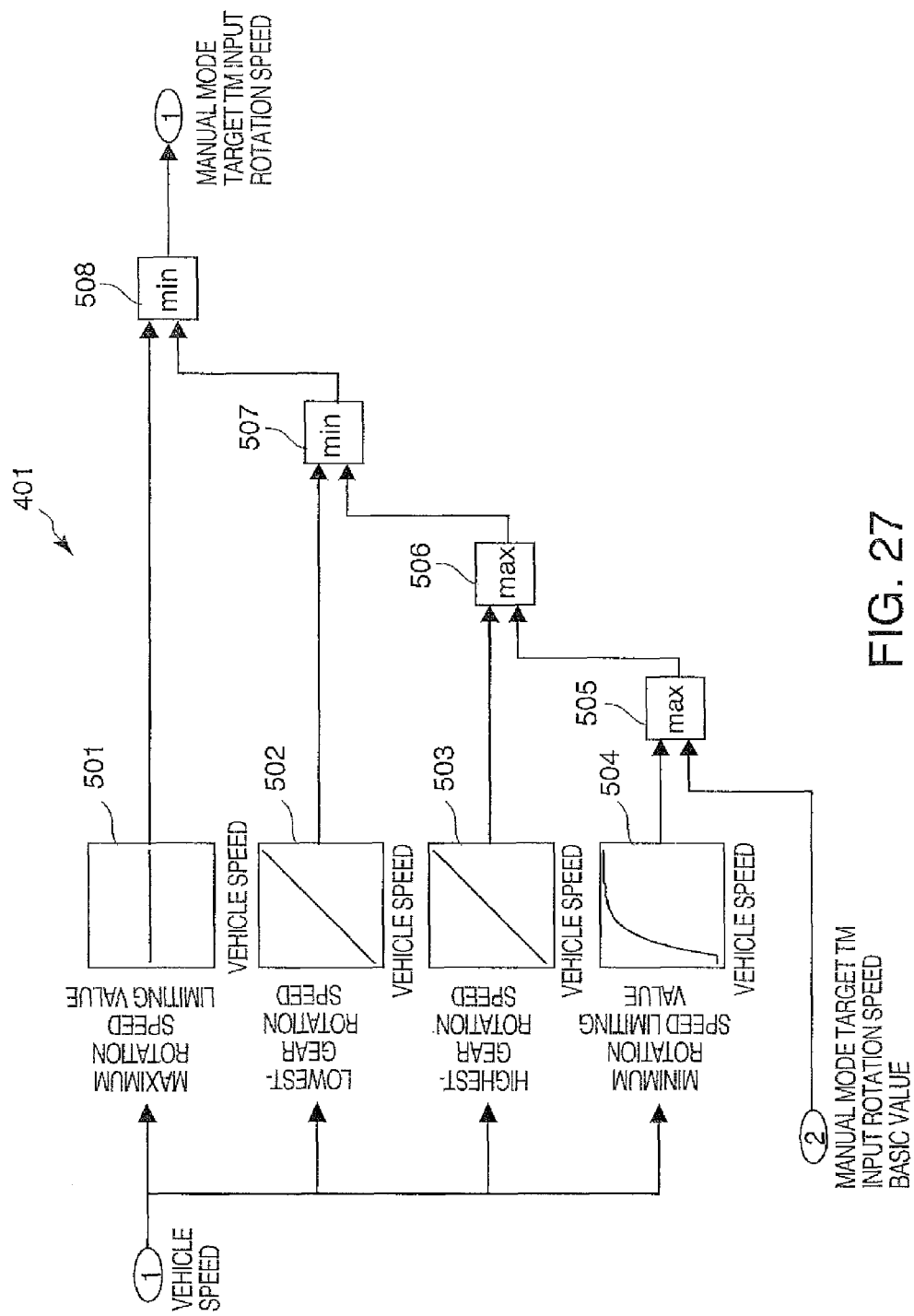
FIG. 27 is a block diagram illustrating a configuration of a manual mode target TM input rotation speed basic value computation part according to the third embodiment of the present invention.

FIG. 27 shows a configuration of the manual mode target TM input rotation speed computation part 401.

Referring to FIG. 27, the manual mode target TM input rotation speed computation part 401 comprises a maximum rotation speed limiting value computation part 501, a lowest-gear rotation speed computation part 502, a highest-gear rotation speed computation part 503, a minimum rotation speed limiting value computation part 504, maximum value output circuits 505 and 506, and minimum value output circuits 507 and 508.

The maximum rotation speed limiting value computation part 501 sets the maximum rotation speed limiting value from the maximum rotation speed of the internal combustion engine 1. The lowest-gear rotation speed computation part 502 computes a TM input rotation speed corresponding to the lowest-gear speed ratio from the vehicle speed and the first speed gear ratio, which corresponds to the lowest-gear speed ratio, as the lowest-gear rotation speed. The highest-gear rotation speed computation part 503 computes a TM input rotation speed corresponding to the highest-gear speed ratio from the vehicle speed and the sixth speed gear ratio, which corresponds to the highest-gear speed ratio, as the highest-gear rotation speed. The minimum rotation speed limiting value computation part 504 sets a minimum rotation speed limiting value that corresponds to the vehicle speed from the minimum rotation speed of the internal combustion engine 1.

The maximum value output circuit 505 compares the manual mode target TM input rotation speed basic value computed by the manual mode target TM input rotation speed basic value computation part 251 with the minimum rotation speed limiting value, and outputs the larger thereof. In other words, a lower limit of the manual mode target TM input rotation speed basic value is limited by the minimum rotation speed limiting value.

The maximum value output circuit 506 compares the output of the maximum value output circuit 505 with the highest-gear rotation speed, and outputs the larger thereof.

In other words, a lower limit of the output of the maximum value output circuit 505 is limited by the highest-gear rotation speed.

The minimum value output circuit 507 compares the output of the maximum value output circuit 506 with the lowest-gear rotation speed, and outputs the smaller thereof. In other words, an upper limit of the maximum value output circuit 506 is limited by the lowest-gear rotation speed. The minimum value output circuit 508 compares the output of the minimum value output circuit 507 with the maximum rotation speed limiting value, and outputs the smaller thereof. In other words, an upper limit of the minimum value output circuit 507 is limited by the maximum rotation speed limiting value.

Hence, the manual mode target TM input rotation speed computation part 401 outputs a value to which limitations based on specifications of the internal combustion engine 1 and the manual mode of the CVT 12 have been added as the manual mode target TM input rotation speed.

Figure 28:
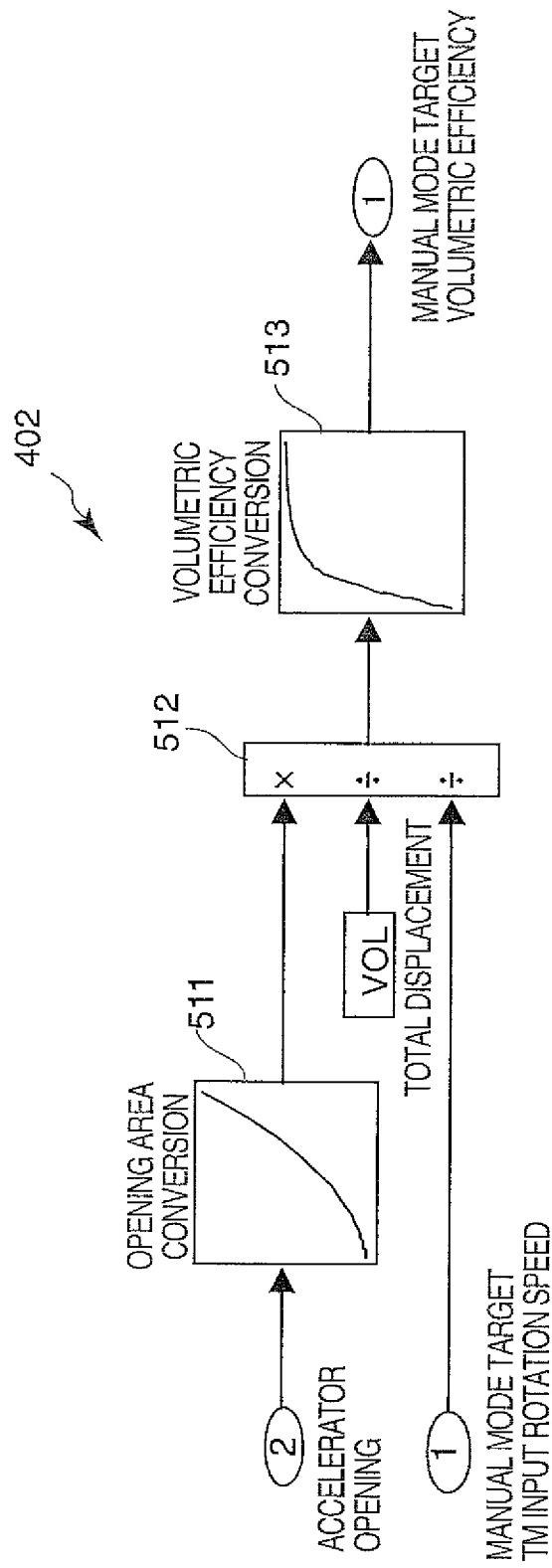
FIG. 28 is a block diagram illustrating a configuration of a manual mode target volumetric efficiency computation part according to the third embodiment of the present invention.

FIG. 28 shows a configuration of the manual mode target volumetric efficiency computation part 402.

Referring to FIG. 28, the manual mode target volumetric efficiency computation part 402 comprises an opening area conversion part 511, a divider 512, and a volumetric efficiency conversion part 513.

The opening area conversion part 511 converts the accelerator opening into an opening area of the intake throttle device 3 by referring to a map stored in advance in the ROM of the controller 21. The divider 512 computes a unit opening area per unit exhaust gas amount and per unit rotation by dividing the opening area by the exhaust gas amount of the internal combustion engine 1 and the manual mode target TM input rotation speed computed by the manual mode target TM input rotation speed computation part 401. The volumetric efficiency conversion part 513 computes a manual mode target volumetric efficiency from the unit opening area computed by the divider 512 by referring to a map stored in advance in the ROM of the controller 21.

Figure 29:
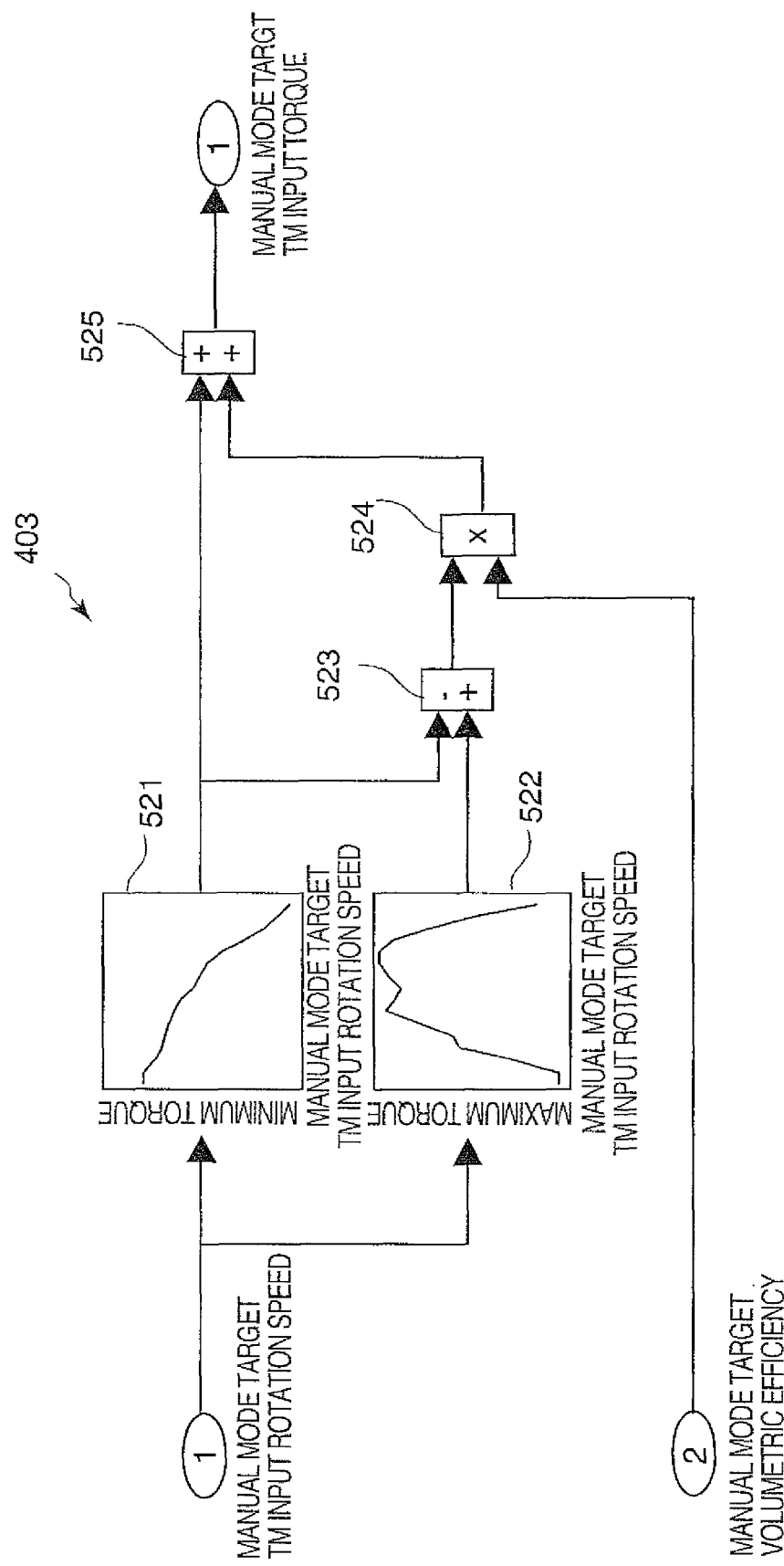
FIG. 29 is a block diagram illustrating a configuration of a manual mode target TM input torque computation part according to the third embodiment of the present invention.

FIG. 29 shows a configuration of the manual mode target TM input torque computation part 403.

Referring to FIG. 29, the manual mode target TM input torque computation part 403 comprises a minimum torque computation part 521, a maximum torque computation part 522, a subtracter 523, a multiplier 524, and an adder 525.

The minimum torque computation part 521 determines the minimum torque that can be input into the CVT 12 from the manual mode target TM input rotation speed computed by the manual mode target TM input rotation speed computation part 401 by referring to a map stored in advance in the ROM of the controller 21.

The maximum torque computation part 522 determines the maximum torque that can be input into the CVT 12 from the manual mode target TM input rotation speed computed by the manual mode target TM input rotation speed computation part 401 by referring to a map stored in advance in the ROM of the controller 21.

The subtracter 523 calculates the difference between the maximum torque and the minimum torque. The multiplier 524 multiplies the difference between the maximum torque the minimum torque by the manual mode target volumetric efficiency computed by the manual mode target volumetric efficiency computation part 402. The adder 525 computes a manual mode target TM input torque by adding an output of the multiplier 524 to the minimum torque.

Similarly to the target TM input torque lower limit correction value computation part 143 of the first embodiment, the manual mode target TM input torque computation part 403 calculates the manual mode target TM input torque by making use of the fact that a basically linear relationship exists between the volumetric efficiency and the engine torque of the internal combustion engine 1. The engine torque, on the other hand, is determined univocally from the rotation speed and the volumetric efficiency of the internal combustion engine, and therefore, according to one or more embodiments of the present invention, the manual mode target TM input torque is determined directly from the manual mode target TM input rotation speed and the manual mode target volumetric efficiency by referring to a three-dimensional map on which the engine torque is plotted using the rotation speed and the volumetric efficiency as parameters, this map being stored in advance in the ROM of the controller 21.

Figure 30:
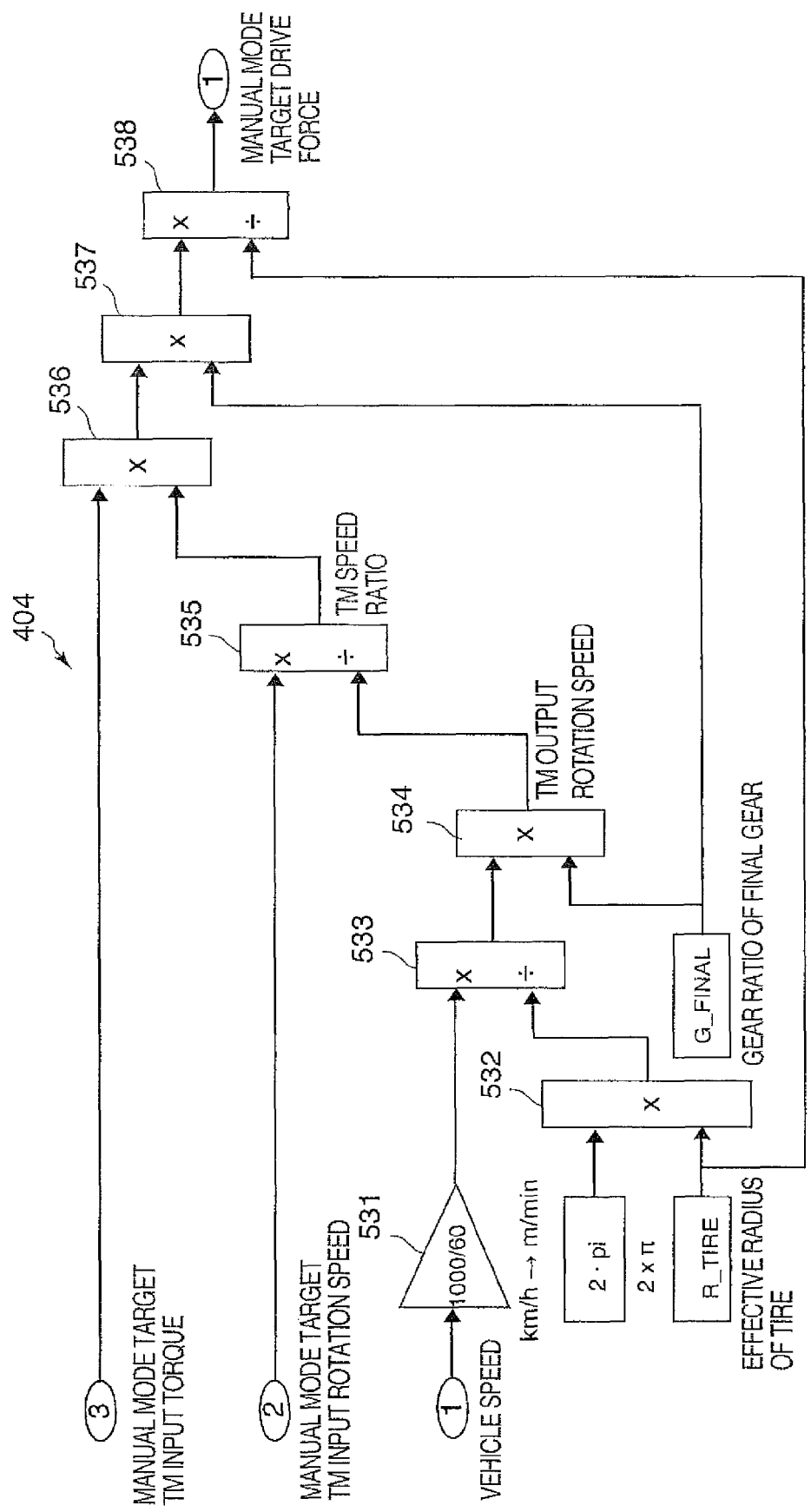
FIG. 30 is a block diagram illustrating a configuration of a manual mode target drive force computation part according to the third embodiment of the present invention.

FIG. 30 shows a configuration of the manual mode target drive force output part 404.

Referring to FIG. 30, the manual mode target drive force output part 404 comprises a unit converter 531, multipliers 532, 534, 536, 537, and dividers 533, 535, 538.

The unit converter 531 converts the vehicle speed into in/min units. The multiplier 532 calculates the circumferential distance of the tire from the diameter of the tire. The divider 533 calculates the rotation speed of the tire from the vehicle speed and the circumferential distance of the tire. The multiplier 534 calculates the output rotation speed of the CVT 12 by multiplying the gear ratio of the final gear 53 provided between the CVT 12 and the drive wheel of the vehicle by the rotation speed of the tire. The divider 535 converts the manual mode target TM input rotation speed into the target speed ratio of the CVT 12 by dividing the manual mode target TM input rotation speed by the output rotation speed of the CVT 12.

The multiplier 536 computes a target output torque of the CVT 12 by multiplying the target speed ratio of the CVT 12 by the manual mode target TM input torque computed by the manual mode target TM input torque computation part 403. The multiplier 537 calculates a final torque by multiplying the final gear ratio by the target output torque. The divider 538 computes a manual mode target drive force by dividing the final torque by the effective tire radius R_TIRE.

Figure 31:
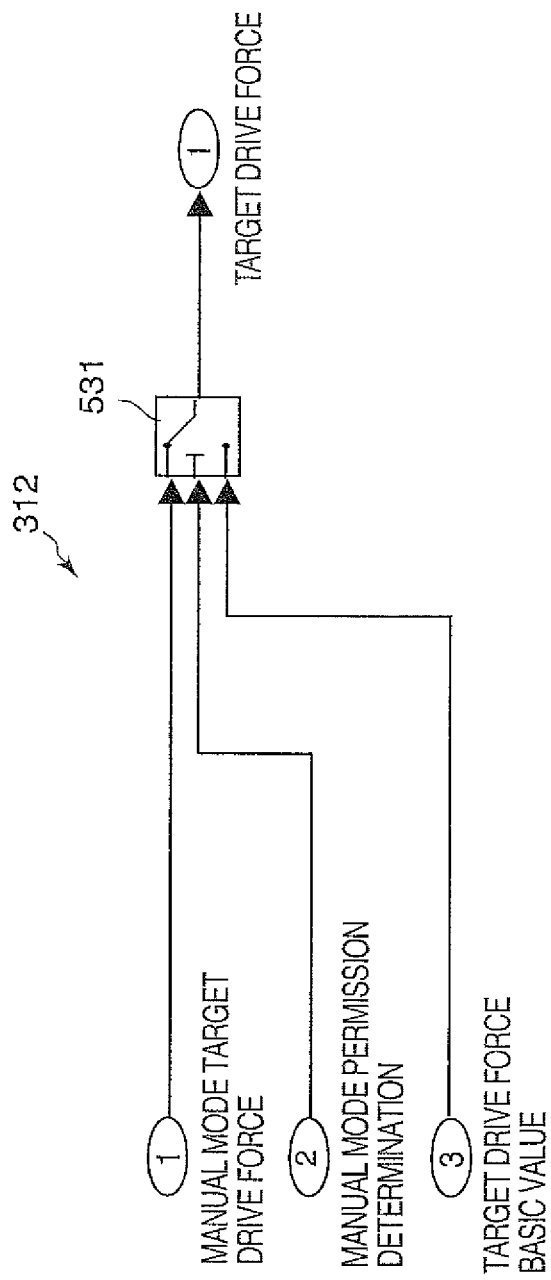
FIG. 31 is a block diagram illustrating a configuration of a target drive force computation part according to the third embodiment of the present invention.

FIG. 31 shows a configuration of the target drive force output part 312.

Referring to FIG. 31, the target drive force output part 312 is constituted by a switch 531.

When the manual mode permission determination signal is ON, the switch 531 outputs the manual mode target drive force output by the manual mode target drive force output part 404 as the target drive force. When the manual mode permission determination signal is OFF, the switch 531 outputs the target drive force basic value output by the target drive force basic value computation part 71 as the target drive force.

Figure 32:
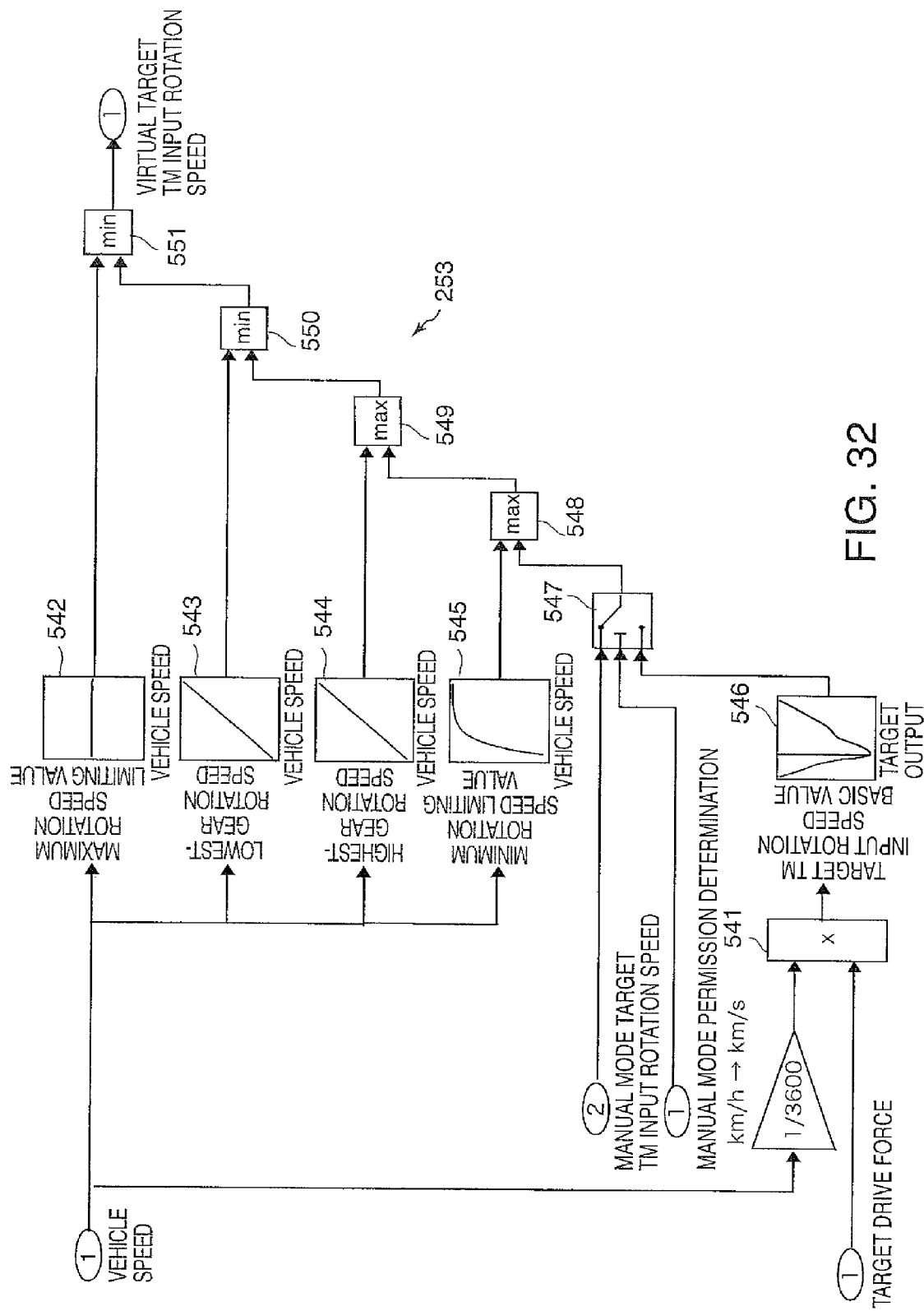
FIG. 32 is a block diagram illustrating a configuration of a target TM input rotation speed computation part according to the third embodiment of the present invention.

FIG. 32 shows a configuration of the target TM input rotation speed computation part 253.

Referring to FIG. 32, the target TM input rotation speed computation part 253 comprises a maximum rotation speed limiting value computation part 542, a lowest-gear rotation speed computation part 543, a highest-gear rotation speed computation part 544, a minimum rotation speed limiting value computation part 545, a multiplier 541, a target TM input rotation speed basic value computation part 546, a switch 547, maximum value output circuits 548 and 549, and minimum value output circuits 550 and 551.

The maximum rotation speed limiting value computation part 542 outputs the maximum rotation speed limiting value, which is a fixed value stored in advance. The lowest-gear rotation speed computation part 543 calculates the lowest-gear rotation speed that can be input within the first speed gear ratio, which corresponds to the lowest gear ratio of the CVT 12, from the vehicle speed. The highest-gear rotation speed computation part 544 calculates the highest-gear rotation speed that can be input within the sixth speed gear ratio, which corresponds to the highest gear ratio of the CVT 12, from the vehicle speed. The minimum rotation speed limiting value computation part 545 calculates the minimum rotation speed limiting value in accordance with the vehicle speed. The multiplier 541 calculates the target output by multiplying the target drive force output by the target drive force computation part 252 by the vehicle speed, the vehicle speed having been converted into a speed per second. An output corresponding to a load of an accessory may also be added to the target output. Further, in the case of a hybrid electric vehicle (HEV), a target power generation output may also be added. The target TM input rotation speed basic value computation part 546 calculates the target TM input rotation speed basic value on the basis of the target output.

When the manual mode permission signal is ON, the switch 547 outputs the manual mode target TM input rotation speed basic value computed by the manual mode target TM input rotation speed basic value computation part 251. When the manual mode permission signal is OFF, the switch 547 outputs the target TM input rotation speed basic value computed by the target TM input rotation speed basic value computation part 546.

The maximum value output circuit 548 outputs the larger of the output of the switch 547 and the minimum rotation speed limiting value output by the minimum rotation speed limiting value computation part 545. The maximum value output circuit 549 outputs the larger of the output of the maximum value output circuit 548 and the highest-gear rotation speed output by the highest-gear rotation speed computation part 544.

The minimum value output circuit 550 outputs the smaller of the output of the maximum value output circuit 549 and the lowest-gear rotation speed output by the lowest gear rotation speed computation part 543. The minimum value output circuit 551 outputs the smaller of the output of the minimum value output circuit 550 and the maximum rotation speed limiting value, output by the maximum rotation speed limiting value computation part 542, as the target TM input rotation speed.

The target TM input torque computation part 54 is configured identically to the target TM input torque computation part 54 according to the first embodiment, shown in FIG. 3. More specifically, the target TM input torque computation part 54 computes the target TM input torque from the vehicle speed, the target drive force computed by the target drive force computation part 252, and the target TM input rotation speed computed by the target TM input rotation speed computation part 253.

According to the third embodiment, identical drive force variation to that expected by the driver can be realized in accordance with a depression amount of the accelerator pedal and a shift operation in a vehicle comprising a manual mode.

In the third embodiment, the manual mode target TM input rotation speed basic value computation part 251, the target drive force computation part 252, and the target TM input rotation speed computation part 253 constitute individually required target transmission input rotation speed computation means, target drive force computation means, and target transmission input rotation speed computation means, respectively.

Figure 33:
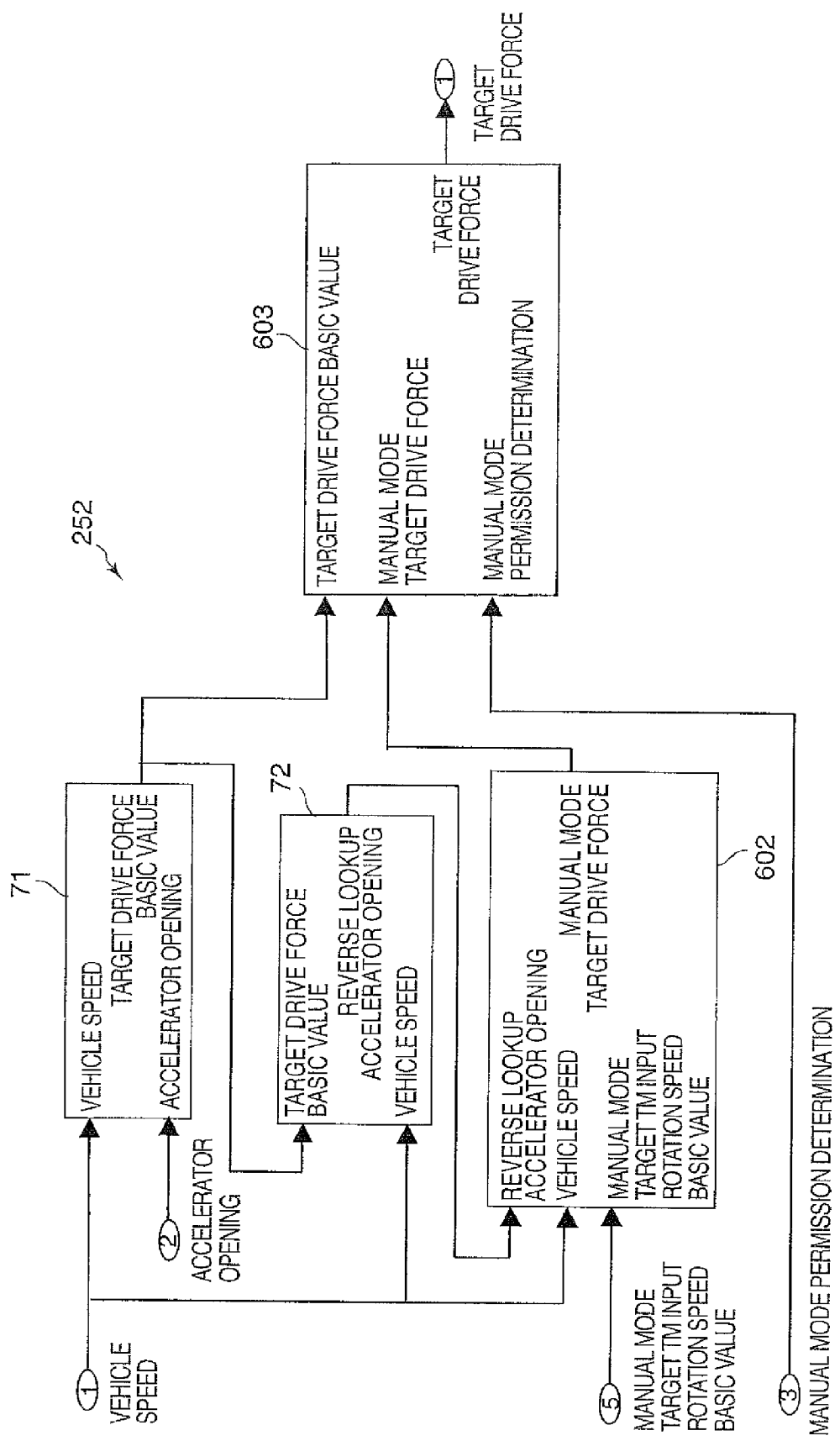
FIG. 33 is a block diagram illustrating a configuration of a target drive force computation part according to a fourth embodiment of the present invention.
Figure 34:
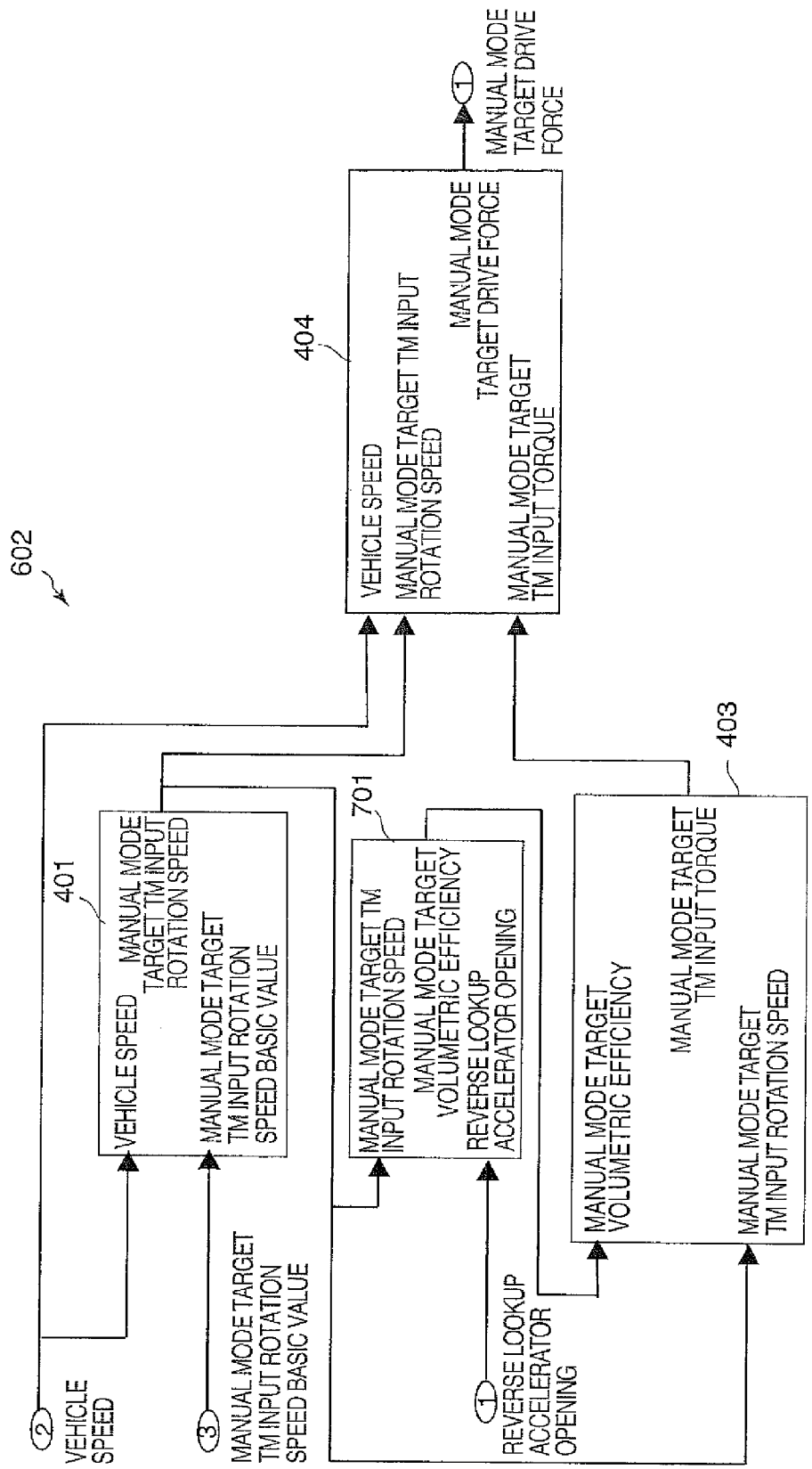
FIG. 34 is a block diagram illustrating a configuration of a manual mode target drive force computation part according to the fourth embodiment of the present invention.
Figure 35:
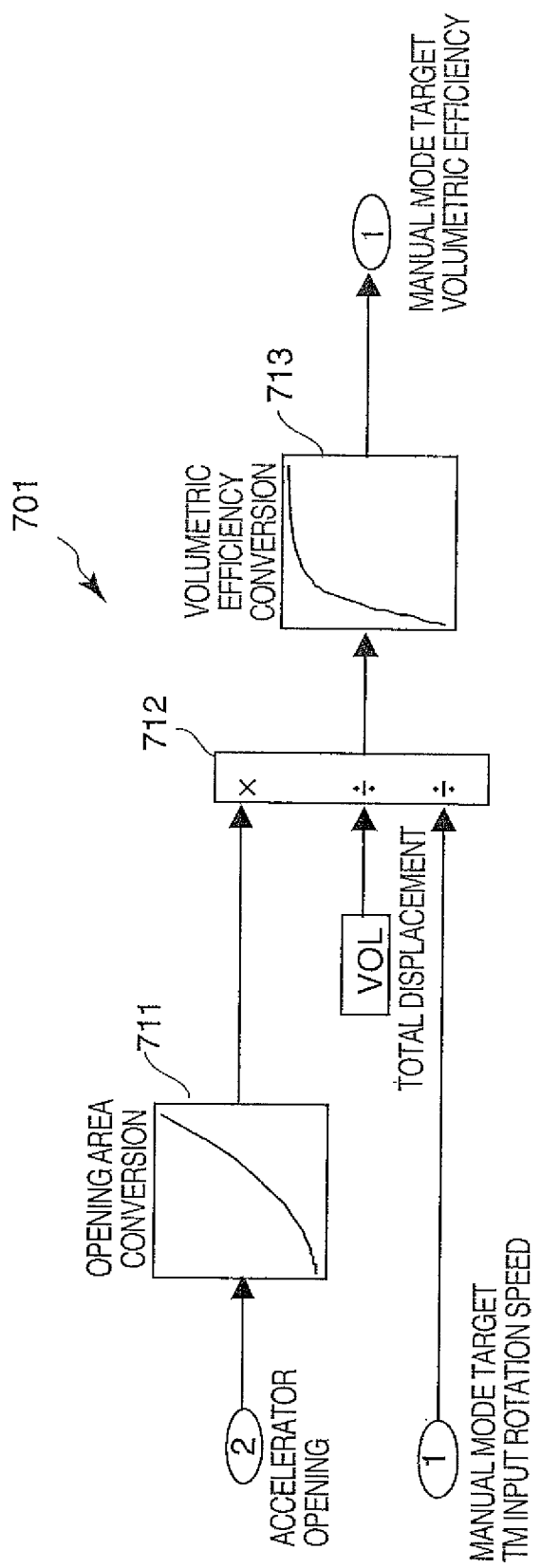
FIG. 35 is a block diagram illustrating a configuration of a manual mode target volumetric efficiency computation part according to the fourth embodiment of the present invention.

Referring to FIGS. 33 to 35, a drive force control device for a vehicle according to a fourth embodiment of the present invention will be described.

Similarly to the third embodiment, the drive force control device according to the fourth embodiment is applied to a vehicle in which an automatic shift mode and a manual mode are applied in accordance with a selection made by the driver. However, the drive force control device according to the fourth embodiment differs from the third embodiment in that, similarly to the first embodiment, the reverse lookup accelerator opening is computed on the basis of the target drive force basic value and the manual mode target drive force is computed on the basis of the reverse lookup accelerator opening.

More specifically, the manual mode target TM input rotation speed basic value computation part 251, the target TM input rotation speed computation part 253, and the target TM input torque computation part 54 of the drive force control device according to the fourth embodiment are configured identically to the third embodiment, and only the target drive force computation part 252 is configured differently to the third embodiment.

Referring to FIG. 33, the target drive force computation part 252 comprises the target drive force basic value computation part 71, the reverse lookup accelerator opening computation part 72, a manual mode target drive force computation part 602, and a target drive force output part 603.

The target drive force basic value computation part 71 is configured identically to the target drive force basic value computation part 71 according to the first embodiment. The reverse lookup accelerator opening computation part 72 is configured identically to the reverse lookup accelerator opening computation part 72 according to the first embodiment.

FIG. 34 shows a configuration of the manual mode target drive force computation part 602.

Referring to FIG. 34, the manual mode target drive force computation part 602 comprises the manual mode target TM input rotation speed computation part 401, a manual mode target volumetric efficiency computation part 701, the manual mode target TM input torque computation part 403, and the manual mode target drive force output part 404.

Of these components, the manual mode target TM input rotation speed computation part 401, the manual mode target TM input torque computation part 403, and the manual mode target drive force output part 404 are respectively configured identically to the manual mode target TM input rotation speed computation part 401, the manual mode target TM input torque computation part 403, and the manual mode target drive force output part 404 according to the third embodiment.

FIG. 35 shows a configuration of the manual mode target volumetric efficiency computation part 701.

Referring to FIG. 35, the manual mode target volumetric efficiency computation part 701 comprises an opening area conversion part 711, a divider 712, and a volumetric efficiency conversion part 713.

The opening area conversion part 711 converts the reverse lookup accelerator opening computed by the reverse lookup accelerator opening computation part 72 into an opening area of the intake throttle device 3 by referring to a map stored in advance in the ROM of the controller 21. The divider 712 computes a unit opening area per unit exhaust gas amount and per unit rotation by dividing the opening area by the exhaust gas amount of the internal combustion engine 1 and the manual mode target TM input rotation speed computed by the manual mode target TM input rotation speed computation part 401. The volumetric efficiency conversion part 713 computes a manual mode target volumetric efficiency from the unit opening area computed by the divider 712 by referring to a map stored in advance in the ROM of the controller 21.

Referring back to FIG. 33, when the manual mode permission determination signal is ON, the target drive force output part 603 outputs the manual mode target drive force, computed by the manual mode target drive force computation part 602, as the target drive force. When the manual mode permission determination signal is OFF, the target drive force output part 603 outputs the target drive force basic value, computed by the target drive force basic value computation part 71, as the target drive force.

As described above, the drive force control device according to the fourth embodiment computes the reverse lookup accelerator opening on the basis of the target drive force basic value, and computes the manual mode target drive force on the basis of the reverse lookup accelerator opening. Therefore, even when the target drive force basic value is set arbitrarily, the drive force can be made to vary in response to variation in the TM input rotation speed with an appropriate degree of sensitivity.

According to one or more embodiments of the present invention, as described above, drive force control corresponding to a Hi-limiter or a manual mode drive force request can be realized in a similar manner to conventional ETD control even during PTD control. In other words, drive force variation in response to a rotation request relating to the internal combustion engine can be realized with a similar degree of sensitivity to that of conventional ETD control. Further, similar functional requirements to those of conventional ETD control can be satisfied without divergence between the target drive force and the actual drive force.

Although the invention has been described above with reference to certain embodiments, the invention is not limited to the embodiments described above. Modifications and variations of the embodiments described above will occur to those skilled in the art, within the scope of the claims.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A drive force control device for a vehicle, the vehicle comprising a continuously variable transmission that varies an output rotation of a motive force source and transmits a rotation after variation to a drive wheel, the drive force control device comprising:
    an accelerator pedal opening sensor that detects an accelerator opening of an accelerator pedal with which the vehicle is provided; and
    a programmable controller programmed to:
        calculate a target drive force on the basis of the accelerator opening,
        calculate a target transmission input rotation speed on the basis of the target drive force,
        calculate a target transmission input torque on the basis of the target drive force,
        control a speed ratio of the continuously variable transmission to realize the target transmission input rotation speed,
        control an output torque of the motive force source to realize the target transmission input torque,
        calculate a target transmission input rotation speed basic value on the basis of the target drive force,
        calculate the target transmission input rotation speed on the basis of the target transmission input rotation speed basic value and an individually required target transmission input rotation speed,
        calculate a target drive force basic value on the basis of the accelerator opening,
        calculate a target transmission input rotation speed lower limit basic value on the basis of an individual requirement, and
        calculate the target drive force on the basis of the target drive force basic value and the target transmission input rotation speed lower limit basic value.

2. The drive force control device according to claim 1, wherein the controller is further programmed to calculate a target drive force lower limit correction value on the basis of the target transmission input rotation speed lower limit basic value and the accelerator opening, and calculate the target drive force on the basis of the target drive force lower limit correction value and the target drive force basic value.

3. The drive force control device according to claim 2, wherein the controller is further programmed to calculate a target transmission input rotation speed lower limit value on the basis of the target transmission input rotation speed lower limit basic value, and calculate the target drive force lower limit correction value on the basis of the target transmission input rotation speed lower limit value and the accelerator opening.

4. The drive force control device according to claim 3, wherein the controller is further programmed to calculate a target transmission input torque lower limit correction value on the basis of the target transmission input rotation speed lower limit value and the accelerator opening, and calculate the target drive force lower limit correction value on the basis of the target transmission input rotation speed lower limit value.

5. The drive force control device according to claim 3, wherein the controller is further programmed to perform a determination as to whether or not to perform a correction of the target drive force basic value on the basis of the target drive force lower limit correction value and perform the correction of the target drive force basic value according to the determination, determine whether or not to increase correct the target drive force basic value on the basis of an excess drive force request and an engine brake request, and determine whether or not to decrease correct the target drive force basic value on the basis of an engine volumetric efficiency.

6. The drive force control device according to claim 5, wherein the controller is further programmed to calculate a target volumetric efficiency lower limit correction value on the basis of a reverse lookup accelerator opening calculated from the target drive force basic value, the target transmission input rotation speed lower limit value, and an engine exhaust amount, and determine, on the basis of the target volumetric efficiency lower limit correction value, whether or not to decrease correct the target drive force basic value.

7. The drive force control device according to claim 2, wherein a reverse lookup accelerator opening calculated from the target drive force basic value is used as the accelerator opening used for the calculation of the target drive force lower limit correction value.

8. The drive force control device according to claim 1, wherein the continuously variable transmission has a manual mode in which a fixed speed ratio selected from a plurality of fixed speed ratios is applied, and the controller is further programmed to:
- calculate a manual mode target transmission input rotation speed for the manual mode; and
- calculate a manual mode target drive force on the basis of the manual mode target transmission input rotation speed and the accelerator opening.

9. A drive force control method for a vehicle, the vehicle comprising a continuously variable transmission that varies an output rotation of a motive force source and transmits a rotation after variation to a drive wheel, the method comprising:
- detecting an accelerator opening of an accelerator pedal with which the vehicle is provided;
- calculating a target drive force on the basis of the accelerator opening;
- calculating a target transmission input rotation speed on the basis of at least the target drive force;
- calculating a target transmission input torque on the basis of the target drive force;
- controlling a speed ratio of the continuously variable transmission to realize the target transmission input rotation speed; and
- controlling an output torque of the motive force source to realize the target transmission input torque,
- wherein the target transmission input rotation speed is calculated on the basis of a target transmission input rotation speed basic value calculated on the basis of the target drive force, and an individually required target transmission input rotation speed, and
- wherein the target drive force is calculated on the basis of a target drive force basic value calculated on the basis of the accelerator opening, and a target transmission input rotation speed lower limit basic value calculated on the basis of an individual requirement.

* * * * *